United States Patent
Bekara et al.

(10) Patent No.: US 11,041,972 B2
(45) Date of Patent: Jun. 22, 2021

(54) METHODS AND SYSTEMS TO ENHANCE RESOLUTION OF SEISMIC IMAGES

(71) Applicant: PGS Geophysical AS, Oslo (NO)

(72) Inventors: Maiza Bekara, Kingston Upon Thames (GB); Peter Stroia-Williams, Addlestone (GB)

(73) Assignee: PGS Geophysical AS, Oslo (NO)

( * ) Notice: Subject to any disclaimer, the term of this patent is extended or adjusted under 35 U.S.C. 154(b) by 573 days.

(21) Appl. No.: 16/006,599

(22) Filed: Jun. 12, 2018

(65) Prior Publication Data
US 2018/0364380 A1 Dec. 20, 2018

Related U.S. Application Data

(60) Provisional application No. 62/519,510, filed on Jun. 14, 2017.

(51) Int. Cl.
| | |
|---|---|
| *G01V 1/30* | (2006.01) |
| *G01V 1/38* | (2006.01) |

(52) U.S. Cl.
CPC .............. *G01V 1/307* (2013.01); *G01V 1/301* (2013.01); *G01V 1/3808* (2013.01); *G01V 2210/1293* (2013.01); *G01V 2210/1423* (2013.01)

(58) Field of Classification Search
CPC . G01V 1/30; G01V 1/38; G01V 1/301; G01V 1/3808; G01V 1/307; G01V 2210/1423; G01V 2210/1293
See application file for complete search history.

(56) References Cited

U.S. PATENT DOCUMENTS

| | | | | |
|---|---|---|---|---|
| 2010/0270026 A1* | 10/2010 | Lazaratos | ................ | G01V 1/36 166/369 |
| 2013/0028052 A1* | 1/2013 | Routh | ...................... | G01V 1/28 367/43 |

OTHER PUBLICATIONS

Robinson, Enders A., "Predictive Decomposition of Time Series with Application to Seismic Exploration," Geophysics, vol. XXXII, No. 3, Jun. 1997, pp. 418-484.
Robinson, John C., "A technique for the continuous representation of dispersion in seismic data," Geophysics, vol. 44, Mo. 8, Aug. 1979, pp. 1345-1351.

* cited by examiner

*Primary Examiner* — Isam A Alsomiri
*Assistant Examiner* — Amie M Ndure

(57) ABSTRACT

Methods and systems for generating an image of a subterranean formation from recorded seismic data obtained in a marine seismic survey of a subterranean formation are described. Methods and systems compute a volume of migrated seismic data obtained from the recorded seismic data. Spectrally enhanced traces of the migrated seismic data are computed in overlapping windows of the volume of migrated seismic data. The spectrally enhanced traces of the volume of migrated seismic data are used to generate a spectrally enhanced image of the subterranean formation.

19 Claims, 22 Drawing Sheets

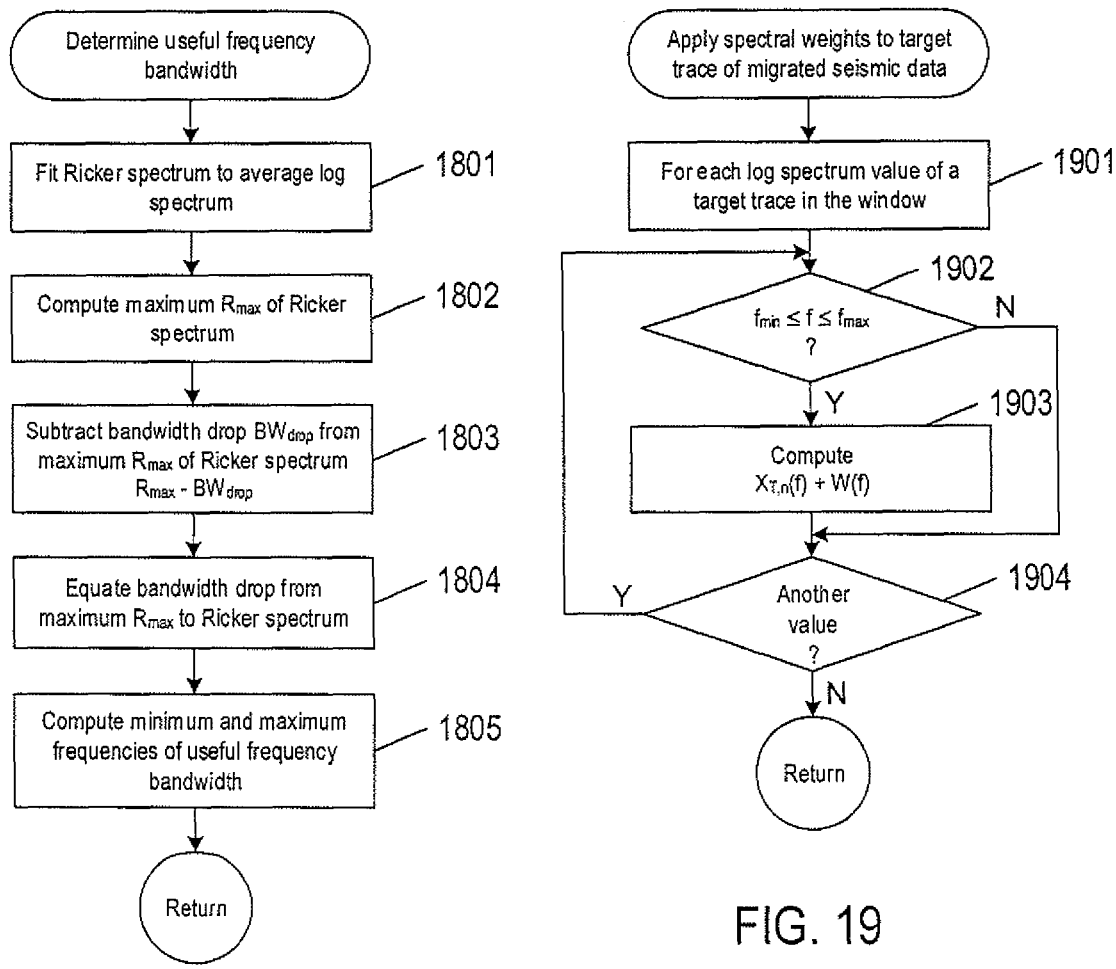

METHODS AND SYSTEMS TO ENHANCE RESOLUTION OF SEISMIC IMAGES

CROSS-REFERENCE TO A RELATED APPLICATION

This application claims the benefit of Provisional Application 62/519,510, filed Jun. 14, 2017, which is hereby incorporated by reference as if entirely set forth herein.

BACKGROUND

Marine seismology companies invest heavily in the development of marine seismic surveying equipment and seismic data processing techniques in order to obtain accurate, high-resolution seismic images of subterranean formations located beneath a body of water. High-resolution seismic images are used to determine the structure of subterranean formations, discover hydrocarbon deposits, and monitor hydrocarbon deposits during production. A typical marine seismic survey is carried out with one or more survey vessels that tow one or two sources and a number of streamers below the surface of the body of water. A typical source comprises an array of source elements, such as air guns. The streamers are elongated cable-like structures towed behind the survey vessel in the direction the survey vessel is traveling. The streamers are arranged substantially parallel to one another to form a seismic data acquisition system. The survey vessel contains seismic acquisition equipment, such as navigation control, source control, seismic receiver control, and seismic data recording equipment.

A typical marine seismic survey is carried out by activating the one or more sources above a subterranean formation. Each activation produces acoustic energy that expands outward in all directions. A portion of the acoustic energy travels downward through the body of water and into the subterranean formation. At each interface between different types of rock and sediment, a portion of the acoustic energy is refracted, a portion is transmitted, and another portion is reflected from each interface into the body of water to propagate toward the free surface. Each streamer includes receivers that generate seismic data in response to detecting pressure and/or particle motion wavefields produced by the acoustic energy reflected into the body of water and is recorded in data-storage devices. The recorded seismic data is subjected to a series of post-processing techniques, including wavefield separation, denoising, reconstruction, interpolation, multiple attenuation, stacking, and migration, to produce two- and three-dimensional seismic images of the subterranean formation. However, the resulting seismic images may appear blurred in places, making it difficult to interpret the seismic images, which leads to uncertainty in identification of hydrocarbon deposits and monitoring production of hydrocarbon deposits within a subterranean formation.

DESCRIPTION OF THE DRAWINGS

FIG. 18 shows a control-flow diagram of the "determine useful frequency bandwidth" module called in FIG. 15.

FIG. 19 shows a control-flow diagram of the "apply spectral weights to target trace of migrated seismic data" module called in FIG. 15.

DETAILED DESCRIPTION

Methods and systems described herein are directed to applying spectral enhancement to migrated seismic data in order to enhance the resolution of seismic images. High resolution seismic images enable geologist, geophysicist, and petroleum engineers to more easily identify subterranean features, faults, and deposits, increase accuracy in identification of petroleum reservoirs, and can be used to more accurately monitor production of a petroleum reservoir. Typically, post-processing spectral enhancement has been applied to seismic data in an effort to enhance the resolution of seismic images. For example, quality factor ("Q") amplitude compensation techniques are applied to seismic data. But these techniques typically fail to enhance low spatial resolution in the Q-field and tend to increase noise at high frequencies. (See e.g., "A technique for the continuous representation of dispersion in seismic data," by J. C. Robinson, *Geophysics*, Vol. 44, No. 8, pp. 1345-1351

(August 1979)). In addition, because the Q-field is a volume with the same dimensions as the seismic data, every seismic data sample includes a numerical Q value. As a result, additional processing is required to remove the increased noise created by the Q-amplitude compensation techniques prior to imaging. Other spectral enhancement techniques, such as statistical deconvolution techniques, are applied to seismic data to enhance the resolution of seismic images. But these techniques are unstable when the signal-to-noise ratio is low and often create phase distortions in the resulting seismic images. (See e.g., "Predictive decomposition of time series with application to seismic exploration," by E. A. Robinson, *Geophysics*, Vol. 32, pp. 418-484 (1967)). In general, current conventional post-processing techniques that are applied to seismic data in an effort to enhance the resolution of seismic images fail to correct residual amplitudes or phase errors, which negatively impact the resolution of seismic images.

Figure 1A:
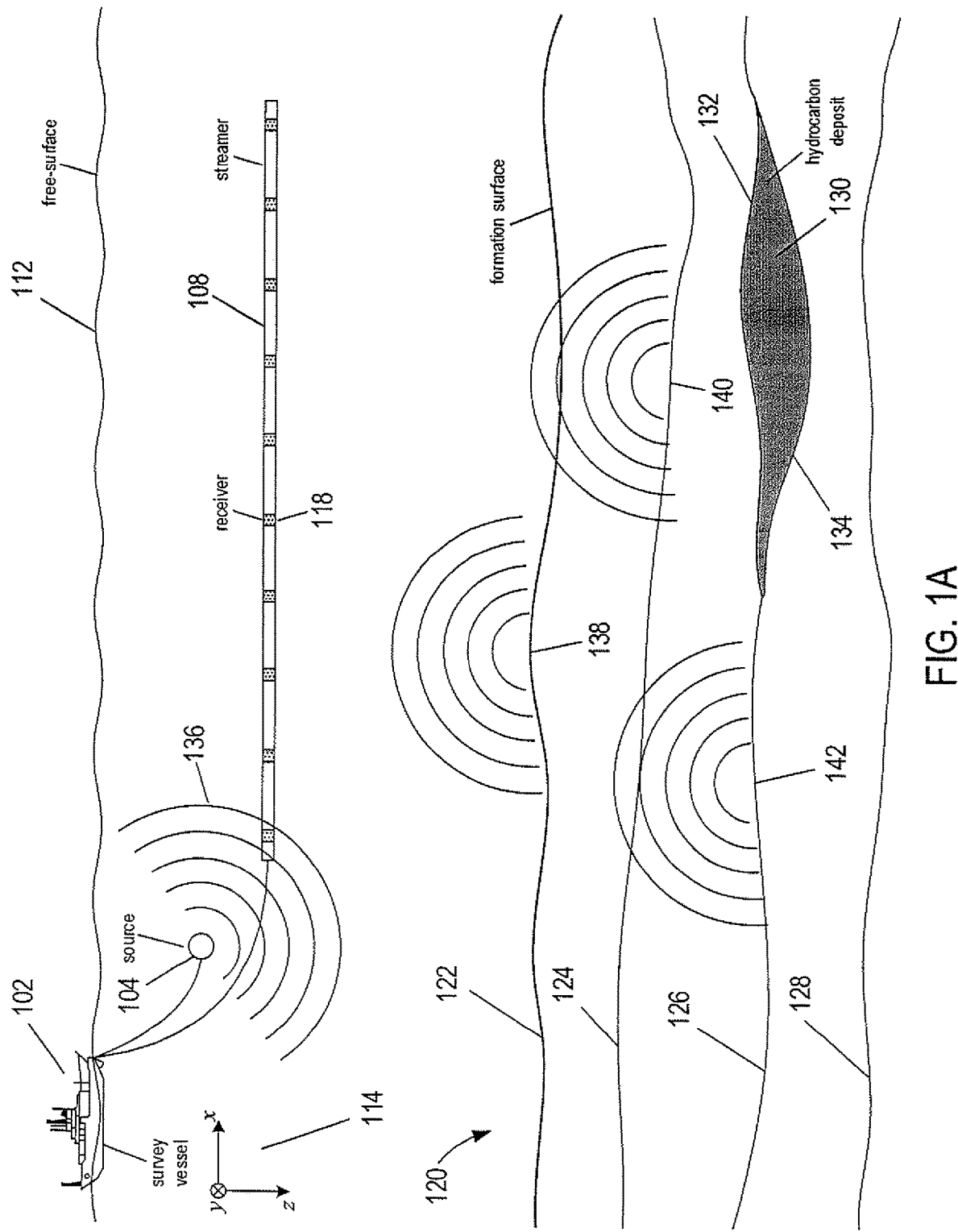
FIGS. 1A-1B show side-elevation and top views of an example seismic data acquisition system.
Figure 1B:
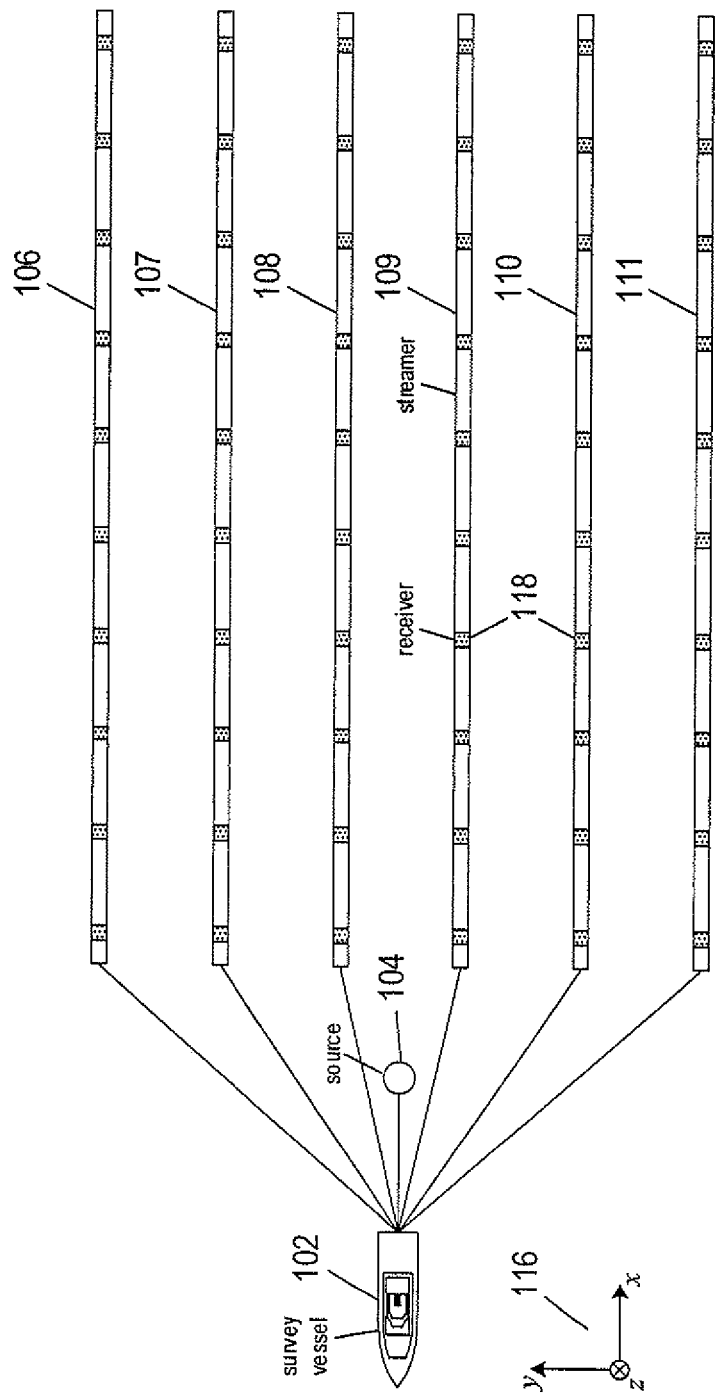

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers or in the direction the survey vessel is traveling and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102. Note that although the streamers 106-111 are illustrated as straight and parallel to one another and the free surface 112, in practice, the streamers undulate due to water currents and free surface swells.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may have a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 is activated (i.e., fired or shot) to produce an acoustic signal. In other implementations, the source 104 may be towed by one survey vessel and the streamers may be towed by a different survey vessel. FIG. 1A shows an acoustic signal expanding outward from the source 104 as a pressure wavefield 136 represented by semicircles of increasing radius centered at the source 104. The outwardly expanding wavefronts from the source may be spherical but are shown in vertical plane cross section in FIG. 1A. The outward and downward expanding portion of the pressure wavefield 136 and any portion of the pressure wavefield 136 reflected from the free-surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source 104.

Acoustic and elastic waves may travel at different velocities within different materials as well as within the same material under different pressures. Therefore, the travel times of the source wavefield and reflected wavefield may be functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
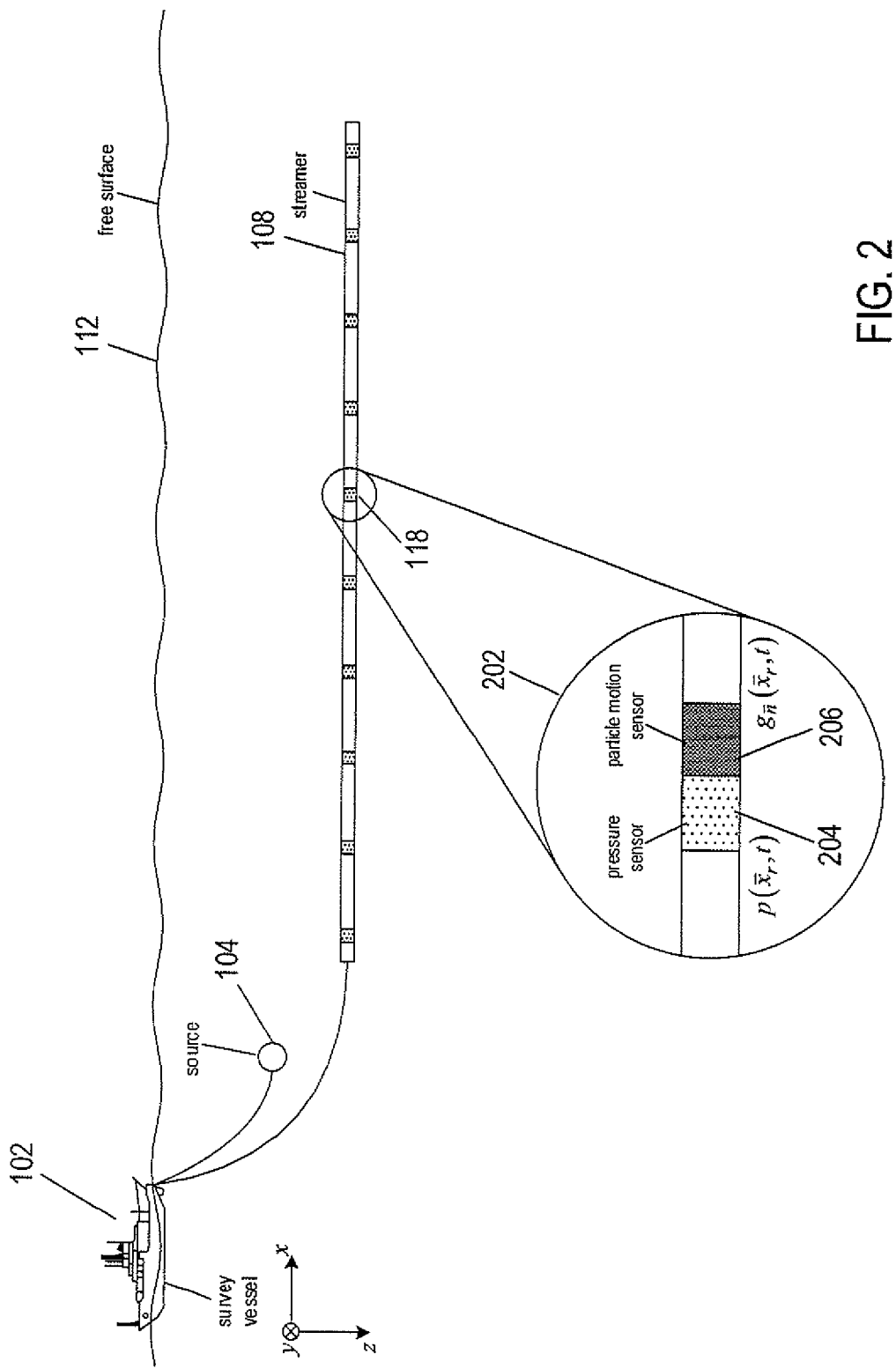
FIG. 2 shows a side-elevation view of a seismic data acquisition system with a magnified view of a receiver.

Each receiver 118 may be a pressure sensor or a multi-component sensor. A multicomponent sensor includes a particle motion sensor and a pressure sensor. A pressure sensor detects variations in water pressure over time. The term "particle motion sensor" is a general term used to refer to a sensor that may be configured to detect particle displacement, particle velocity, or particle acceleration over time. FIG. 2 shows a side-elevation view of the marine seismic data acquisition system with a magnified view 202 of the receiver 118. In this example, the magnified view 202 reveals that the receiver 118 is a multi-component sensor comprising a pressure sensor 204 and a particle motion sensor 206. The pressure sensor may be, for example, a hydrophone. Each pressure sensor is a non-directional sensor that measures changes in hydrostatic pressure over time to produce pressure data denoted by $p(\vec{x}_r,t)$, where $\vec{x}_r$ represents the Cartesian coordinates $(x_r,y_r,z_r)$ of a receiver, superscript r is a receiver index, and t represents time. The particle motion sensors may be responsive to the direction of water motion. In general, particle motion sensors detect particle motion (i.e., displacement, velocity, or acceleration) in a particular direction and may be responsive to such directional displacement of the particles, velocity of the particles, or acceleration of the particles. A particle motion sensor that measures particle displacement generates particle displacement data denoted by $g_{\vec{n}}(\vec{x}_r,t)$, where the vector $\vec{n}$ represents the direction along which particle displacement is measured. A particle motion sensor that measures particle velocity (i.e., particle velocity sensor) generates particle velocity data denoted by $v_{\vec{n}}(\vec{x}_r,t)$. A particle motion sensor that measures particle acceleration (i.e., accelerometer) generates particle acceleration data denoted by $a_{\vec{n}}(\vec{x}_r,t)$. The data generated by one type of particle motion sensor may be converted to another type. For example, particle displacement data may be differentiated to obtain particle velocity data, and particle acceleration data may be integrated to obtain particle velocity data.

The term "particle motion data" is a general term used to refer to particle displacement data, particle velocity data, or particle acceleration data, and the term "seismic data" is used to refer to pressure data and/or particle motion data. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

The particle motion sensors are typically oriented so that the particle motion is measured in the vertical direction (i.e., $\vec{n}=(0,0,z)$) in which case $g_z(\vec{x}_r,t)$ is called vertical displacement data, $v_z(\vec{x}_r,t)$ is called vertical velocity data, and $a_z(\vec{x}_r,t)$ is called vertical acceleration data. Alternatively, each receiver may include two additional particle motion sensors that measure particle motion in two other directions, $\vec{n}$ and $\vec{n}$, that are orthogonal to $\vec{n}$ (i.e., $\vec{n} \cdot \vec{n}_1 = \vec{n} \cdot \vec{n} = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor oriented to measure particle velocity in the z-direction to give $v_z(\vec{x}_r,t)$, each receiver may include a particle motion sensor oriented to measure the wavefield in the in-line direction in order to obtain the inline velocity data, $v_x(\vec{x}_r,t)$, and a particle motion sensor oriented to measure the wavefield in the cross-line direction in order to obtain the cross-line velocity data, $v_y(\vec{x}_r,t)$. The three orthogonal velocity data sets form a velocity vector $\vec{v}$ $(v_x,v_y,v_z)$. In certain implementations, the receivers may be only pressure sensors, and in other implementations, the receivers may be only particle motion sensors.

Returning to FIG. 1B, the streamers 106-111 and the survey vessel 102 may include sensing electronics and data-processing facilities that allow seismic data generated by each receiver to be correlated with the time when the source 104 is activated, absolute positions on the free surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically and/or magnetically on data-storage devices located onboard the survey vessel 102 and/or transmitted onshore to a seismic data-processing facility.

Each pressure sensor and particle motion sensor may include an analog-to-digital converter that converts time-dependent analog signals into discrete time series that consist of a number of consecutively measured values called "amplitudes" separated in time by a sample rate. The time series data generated by a pressure or particle motion sensor is called a "trace," which may consist of thousands of samples collected at a typical sample rate of about 1 sample per ms to 5 samples per ms. A trace is a recording of acoustic energy output from the source 104 and acoustic energy that passes from the source 104 into the subterranean formation, where a portion of the acoustic energy is refracted and/or reflected into the water and is ultimately detected by a sensor as described above. A trace is a record of variations in a time-dependent amplitude that corresponds to fluctuations in acoustic energy of the wavefield measured by the sensor. In general, each trace is an ordered set of discrete spatial and time-dependent pressure or motion sensor amplitudes denoted by:

$$tr(\vec{x}_r,t) = \{A(\vec{x}_r,t_j)\}_{j=0}^{J-1} \quad (1)$$

where tr represents pressure, particle displacement, particle velocity, or particle acceleration amplitude described above;

A represents amplitude;

$t_j$ is the j-th sample time; and

J is the number of time samples in the trace.

The coordinate location $\vec{x}_r$ of each receiver may be calculated from global position information obtained from one or more global positioning devices located along the streamers, survey vessel, and buoys and the known geometry and arrangement of the streamers and receivers. Each trace also includes a trace header not represented in Equation (1) that identifies the specific receiver that generated the trace, receiver and source GPS spatial coordinates, and may include time sample rate and the number of time samples.

As explained above, the reflected wavefield typically arrives first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common-receiver domain are called a common-receiver gather.

Figure 3:
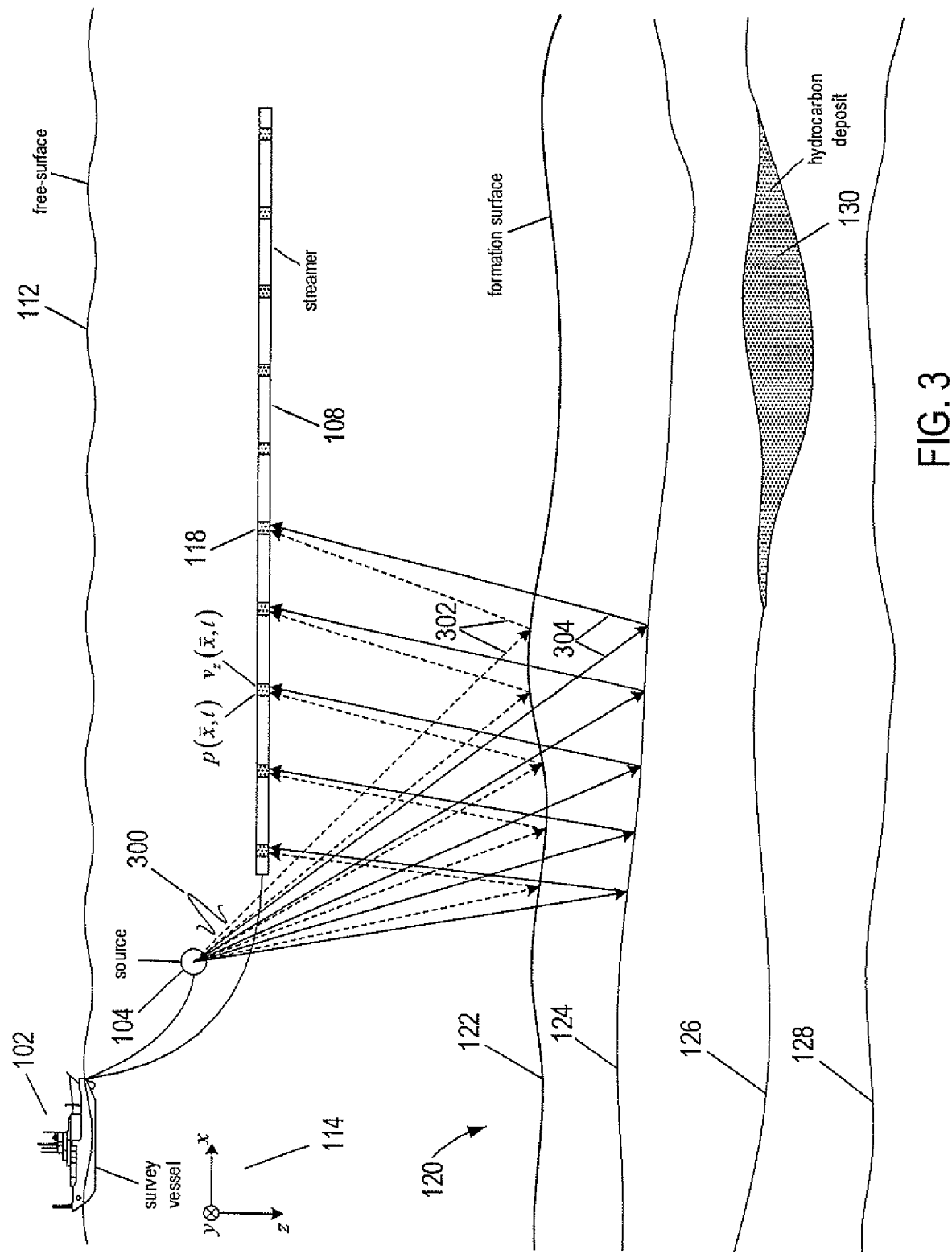
FIG. 3 shows example ray paths of an acoustic signal that travels from a source to surfaces of a subterranean formation.

FIG. 3 shows example ray paths that represent a portion of an acoustic signal 300 that travels from the source 104 into the subterranean formation 120. Dashed-line rays, such as rays 302, represent acoustic energy reflected from the formation surface 122 to receivers 118 located along the streamer 108, and solid-line rays, such as rays 304, represent acoustic energy reflected from the interface 124 to the receivers 118 located along the streamer 108. Note that for simplicity of illustration a small number of straight ray paths are represented. In reality, acoustic energy is reflected back and forth between the free surface and the subterranean formation and acoustic energy that penetrates the subterranean formation experiences transmission, reflection, and refraction at interfaces between layers and far more complicated ray paths would be needed to illustrate the various ways in which acoustic energy propagates within the subterranean formation. In the simplified example of FIG. 3, pressure and particle motion sensors located at each receiver 118 measures hydrostatic pressure vertical particle velocity of the wavefield emanating from the subterranean formation 120 in response to the acoustic signal 300. The pressure data and vertical velocity data generated at each receiver 118 may be time sampled and recorded as separate traces. In the example of FIG. 3, the collection of traces generated by the receivers 118 along the streamer 108 for a single activation of the source 104 may be collected to form a "common-shot gather." The traces generated by the receivers located along each of the other five streamers for the same activation may be collected to form separate common-shot gathers, each gather associated with one of the streamers.

Figure 4:
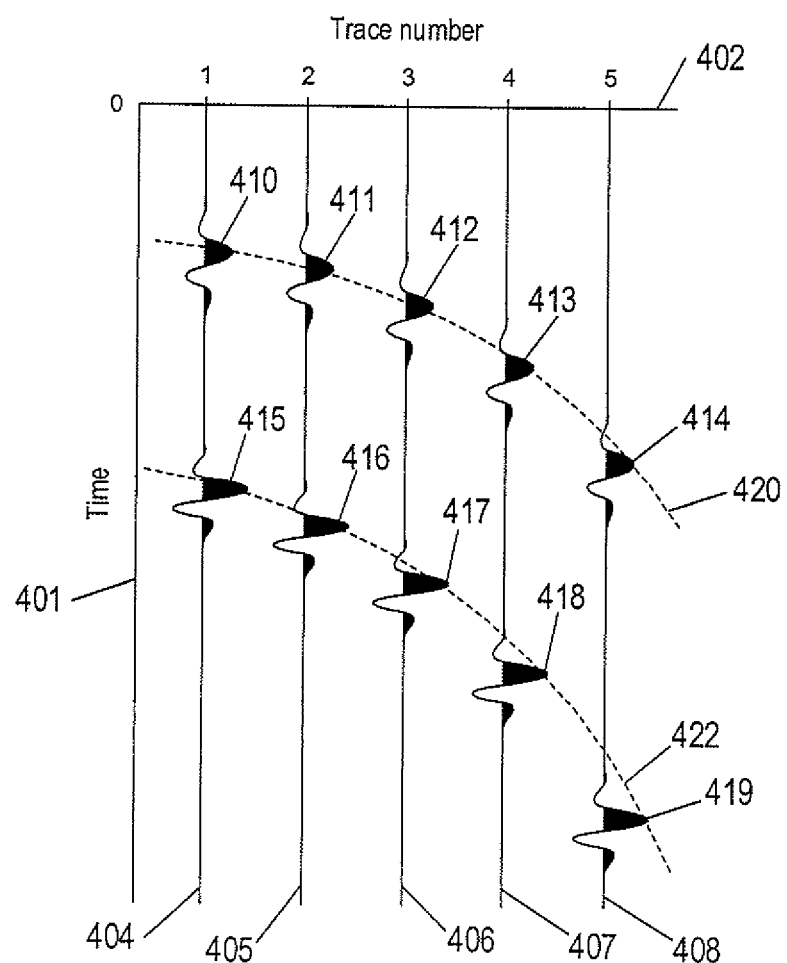
FIG. 4 shows a common-shot gather of a reflected wavefield measured by five adjacent receivers located along a streamer.

FIG. 4 shows a common-shot gather of five example traces of a reflected wavefield measured by five adjacent receivers located along the streamer 108 shown in FIG. 3. Vertical axis 401 represents time. Horizontal axis 402 represents trace numbers with trace "1" representing the seismic data generated by the receiver 118 located closest to the source 104 and trace "5" representing the seismic data generated by the receiver 118 located farther away from the source 104. The traces 404-408 may represent variation in the amplitude of either the pressure data or the particle motion data measured by corresponding sensors of the five receivers 118. The example traces include wavelets or pulses 410-419 that represent the portion of the wavefield reflected from the formation surface 122 and interface 124 of the subterranean formation measured by the pressure sensors or particle motion sensors. Peaks, colored black, and troughs of each trace represent changes in the amplitude. The distances along the traces 404-408 from time zero to the wavelets 410-414 represent two-way travel times of the acoustic energy output from the source 104 to the formation surface 122 and to the receivers 118 located along the streamer 108. Wavelets 415-419 represent longer two-way travel times of the acoustic energy output from the source 104 to the interface 124 and to the same receivers 118 located along the streamer 108. The amplitude of the peak or trough of the wavelets 410-419 indicates the magnitude of the reflected acoustic energy recorded by the receivers 118.

The arrival times versus source-receiver offset is generally longer with increasing source-receiver offset. As a result, the wavelets that represent reflections from a formation surface, or a subterranean interface, are collectively called a "reflected wave" that tracks a curve. For example, curve 420 represents the distribution of the wavelets 410-414 reflected from the formation surface 122, which is called a formation-surface reflected wave, and curve 422 represents the distribution of the wavelets 415-419 from the interface 124, which is called an interface reflected wave.

The wavelets in FIG. 4 represent primary reflected waves or "primaries," which ideally, are the part of seismic data used to generate an image of the subterranean formation. However, in practice, each trace of recorded seismic data collected in marine seismic survey is a record of the primaries and other acoustic energy regarded as noise that tends to obscure the primaries. The noise includes, but is not limited to, the source wavefield, multiple reflections of acoustic energy between the free surface and the subterranean formation called "multiples," swell noise created by free surface swells, streamer noise, barnacle noise, and source and receiver ghost reflections from the free surface.

Seismic data processing is applied to the recorded seismic data in order generate an image of a subterranean formation surveyed in a marine seismic survey as described above. Seismic data processing is typically implemented in a series of modules or routines, each module comprising a series of computer implemented machine-readable instructions. The output of one module is input to a subsequent module. For example, seismic data processing comprises modules that attenuate the various forms of noise, regularize the coordinate locations of the traces, interpolate missing seismic data, migrate the seismic data, and apply an imaging technique to generate an image of a subterranean formation.

Figure 5:
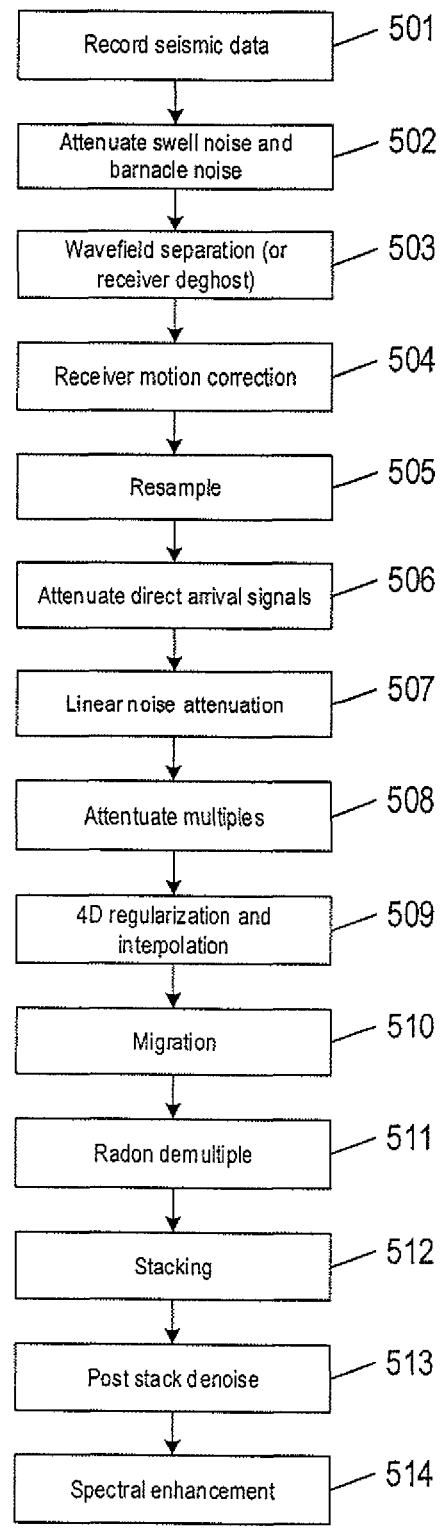
FIG. 5 shows an example series of processing steps applied to recorded seismic data collected in a marine seismic survey to generate an image of a subterranean formation.

FIG. 5 shows an example series of seismic data processing modules that may be applied to recorded seismic data collected in a marine seismic survey described above to generate an image of a subterranean formation. Each block represents a different module of computer implemented machine-readable instructions stored in one or more data-storage devices and executed using one or more processors of computer system. It should be noted that the series of modules represented in FIG. 5 is not an exhaustive list of the modules used to compute an image of a subterranean formation from recorded seismic data. The series of modules are representative of computer implemented instructions used to generate an image of a subterranean formation from recorded seismic data. Processing of recorded seismic data to obtain an image of a subterranean formation may include additional modules or certain modules may be omitted, depending on how the recorded seismic data is collected, conditions underwhich the recorded seismic data is collected or depth of the body of water.

In FIG. 5, block 501 represents recording seismic data as described above with reference to FIGS. 1A-4. The recorded seismic data may be pressure data recorded using receivers configured with pressure sensors alone or the recorded seismic data may be pressure and particle motion data recorded using receivers configured with collocated pressure and particle motion sensors. In block 502, swell noise and barnacle noise in the recorded seismic data is attenuated. In block 503, when the recorded seismic data is measured with pressure and particle motion sensors, the particle motion data is used to separate, or decompose, the pressure data into up-going and down-going pressure data. The up-going pressure data represents pressure wavefields traveling upward from the subterranean formation toward the receivers. The down-going pressure data represents pressure wavefields reflected downward from the free surface toward to the receivers. A down-going pressure wavefield is called a receiver ghost and is typically considered an echo. The down-going pressure wavefield may be used to remove free surface effects. The down-going pressure wavefield recored in the seismic data also creates a ghost image of the subterranean formation within the final image of the subterranean formation. As a result, the down-going pressure wavefield may be used to remove such effects in block 503. When the recorded seismic data comprises pressure data alone, receiver de-ghosting may be used to attenuate the down-going pressure wavefield of the pressure data to obtain the up-going pressure data with multiples attenuated. Seismic data processing may continue with the up-going pressure data. In block 504, because the receivers are moving during recording of the wavefield, receiver-motion correction is applied to the up-going seismic data in order to correct for receiver motion that occurred during the survey. In block 505, the up-going seismic data is resampled. For example, the traces of up-going seismic data may be resampled to have the same sampling rate, such as a sample rate of 4 data points per ms. In block 506, direct arrival signal attenuation is applied to the resampled, up-going seismic data to attenuate the direct source wavefield and source wavefield reflections from the free surface. In block 507, linear noise in the resampled, up-going seismic data is attenuated by modeling linear noise in the seismic data followed by subtracting the modeled linear noise from the resampled, up-going seismic data. In block 508, multiples are attenuated in the resampled, up-going seismic data. The resulting seismic data represents the primary reflected wavefields from the subterranean formation. In block 509, four-dimensional regularization and interpolation is applied to the resampled, up-going seismic data. Because the receivers undulate during seismic data recording, the receiver coordinates of the traces of seismic data are not regularly spaced during recording of the seismic data. Regularization corrects irregularly spaced receiver coordinates of the traces to regularly spaced grid points. Interpolation replaces corrupted traces or fills in traces of the resampled, up-going seismic data at regular grid points from neighboring recorded traces, such as creating traces of seismic data in the crossline direction where receivers are spaced farther apart than in the inline direction. In block 510, migration is applied to the resampled, up-going seismic data in either the space-time coordinate system (i.e., time migration) or Cartesian coordinate system (i.e., depth migration) to obain migrated seismic data (i.e., image of the subterranean formation). Time and depth migration techniques compute a velocity field (e.g., using Dix conversion, time-to-depth conversion, or any other migration velocity analysis technique) that is used to re-locate reflection events recorded in the seismic data in either time or depth to the location the reflection event occurred within the subterranean formation, thereby resulting in a more accurate image of dips and orientations of interfaces within the subterranean formation. Time migration is typically used with vertically varying velocities and does not account for ray bending at interfaces. On the other hand, depth migration accounts for ray bending at interfaces but requires an accurate velocity field model. Depth migration is typically used when there is lateral variation in the velocity field. In block 511, a higher-resolution de-multiples attenuation process, called "Radon demultiple," may be applied to the migrated seismic data to further attenuate multiples recorded in the migrated seismic data. In block 512, the migrated seismic data may be stacked using an averaging process that combines offset-dependent migrated seismic data to obtain post-stacked migrated ("PSM") seismic data, which increases the clarity of the final seismic image by decreasing random noise content across the offsets. In block 513, post-stack denoising may be applied to the migrated seismic data to further reduce random noise content in the migrated seismic data.

Methods described below are directed to applying post-processing spectral enhancement represented by block 514 to the migrated seismic data output from any one of the blocks 510, 511, 512, and 513 in order to obtain spectrally enhanced migrated seismic data. Spectrally enhanced migrated seismic data is a spectrally enhanced seismic image of the subterranean formation. In block 514, spectral enhancement methods enhance the resolution of distinguishable frequency content of the migrated seismic data. Block 514 enhances the resolution of the image of the subterranean formation represented by the migrated seismic data that would otherwise be obtained without spectral enhancement and enhances the resolution compared to conventional spectral enhancement techniques, which typically create image distortions by failing to correct residual amplitudes or phase errors.

Spectral enhancement methods represented by block 514 are described below with reference to migrated seismic data output from any one of the blocks 510, 511, 512, and 513. Any one or more of the post-processing steps 511, 512, and 513 may be omitted prior to executing spectral enhancement in block 514. The migrated seismic data may be PSM seismi data. For example, the migrated seismic data may be post-stacked time-migrated ("PSTM") seismic data obtained from applying time migration at block 510 followed by stacking in block 1512. Alternatively, the migrated seismic data may be depth-to-time stretched post-stacked depth migrated ("PSDM") seismic data obtained from applying depth migration at block 510 followed by applying stacking in block 512 and applying depth-to-time stretching to the PSDM seismic data output from block 513. Depth-to-time stretching applies the velocity field model obtained in block 510 to convert the migrated seismic data output from block 513 from the spatial domain to the space-time domain. After spectral enhancement represented by block 514 has been applied to the depth-to-time stretched PSDM seismic data, as described below, the volume of spectrally enhanced depth-to-time stretched PSDM seismic data is stretched back to the spatial domain using inverse depth-to-time stretching with the inverse of the same velocity field model. The spectrally enhanced migrated seismic data obtained in block 514 is a spectrally enhanced image of the subterranean formation.

In the following description, the term "migrated seismic data" refers to seismic data output from any one of the blocks 510, 511, 512, and 513. The term migrated sesmic data may refer to time-migrated seismic data, such as PSTM seismic data, depth-migrated seismic data, or depth-to-time stretched seismic data, such as PSDM seismic data, depending on whether time or depth migration was applied in block 510 of FIG. 5.

Figure 6:
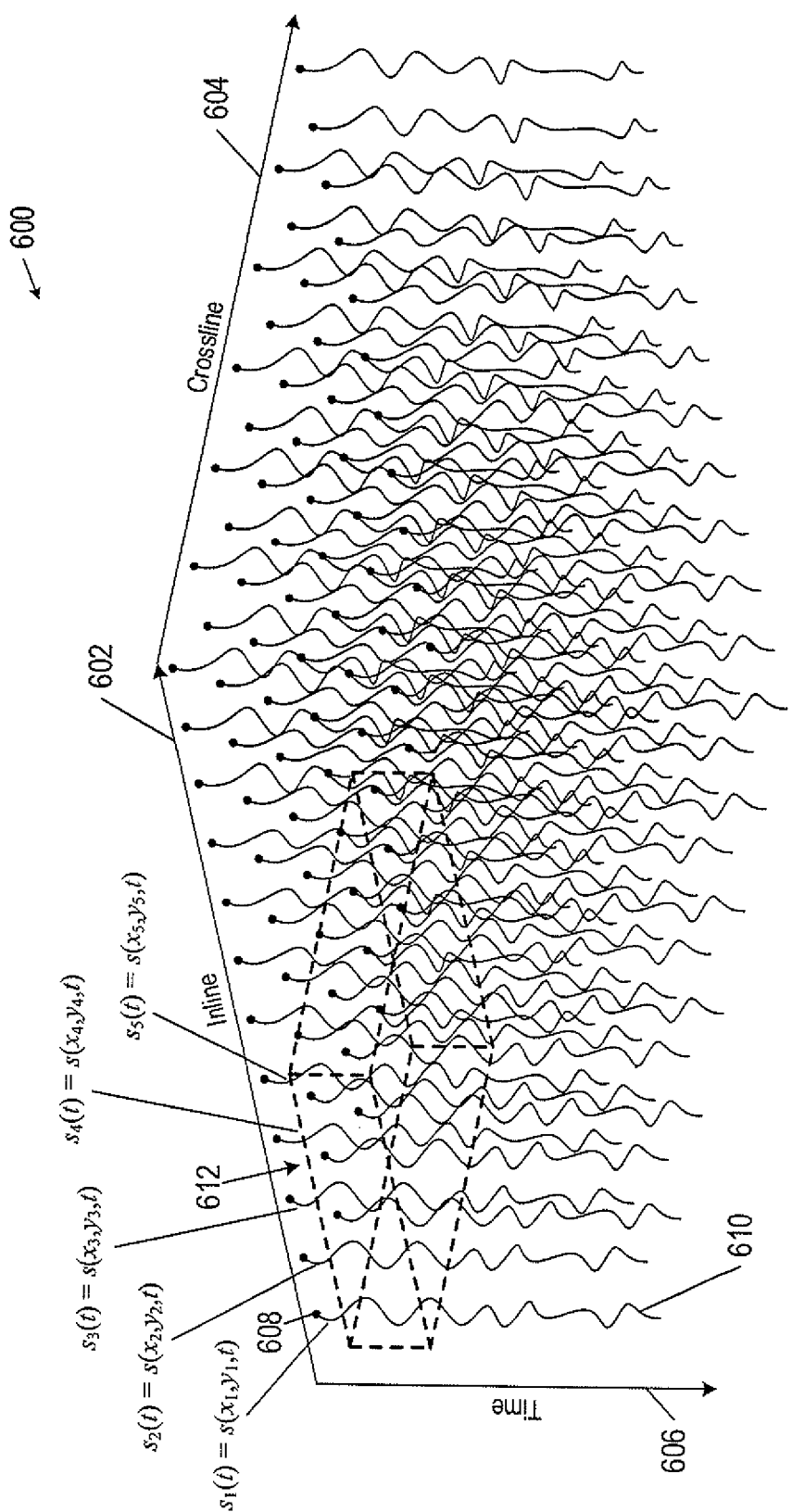
FIG. 6 shows an example volume of migrated seismic data.

FIG. 6 shows an example volume of recorded migrated seismic data obtained as described above with reference to FIG. 5 and recorded in a data-storage device. Directional arrow 602 represents the inline direction. Directional arrow 604 represents the crossline direction. Directional arrow 606 is a time axis. Dots, such as dot 608, represent regularized coordinates obtained as described above in block 509 of FIG. 5. Each regularized coordinate is denoted by $(x_R, y_R)$, where $x_R$ is an inline coordinate, $y_R$ is a crossline coordinate, and subscript R denotes regularized coordinate. Wiggle lines extending from regularized coordinates represent traces of migrated seismic data. For example, wiggle line 610 extending from regularized coordinate 608 represents a single trace of migrated seismic data represented by $s_1(t)=s(x_1,y_1,t)$, where $(x_1,y_1)$ (i.e., R=1) represents the regularized coordinates of the trace. In the example of FIG. 6, the volume 600 of migrated seismic data comprises 84 traces of migrated seismic data, each trace comprising $N_T$ resampled time samples. In practice, the volume of migrated seismic data comprises $N_{SL} \times N_{XL} \times N_T$ migrated seismic data points, where $N_{SL}$ represents the number of traces in the inline direction, and $N_{XL}$ represents the number of traces in the crossline direction.

Spectral enhancement methods described herein are executed in overlapping windows that each contain a fraction of the migrated seismic data points of the larger volume of migrated seismic data. In FIG. 6, dashed-line box 612 represents a window of migrated seismic data points of the larger volume of migrated seismic data. The window 612 spans a two-dimensional area in the inline-crossline plane of the volume 600 and a time interval along the time axis 606. A window in the volume of migrated seismic data contains $n_{SL}$ traces in the inline direction and $n_{XL}$ traces in the crossline direction. In certain implementations, the window may be square within in inline-crossline plane with $n_{SL}=n_{XL}$. In other implementations, the window may be rectangular within inline-crossline plane with $n_{SL} \neq n_{XL}$. The window 612 contains migrated seismic data points with regularized receiver coordinates that lie within the two-dimensional area spanned by the window 612 and have time stamps that lie within the time interval of the window 612. A log spectrum of the migrated seismic data points of each trace contained within the window is computed using a tapered short-time Fourier transform.

Figure 7:
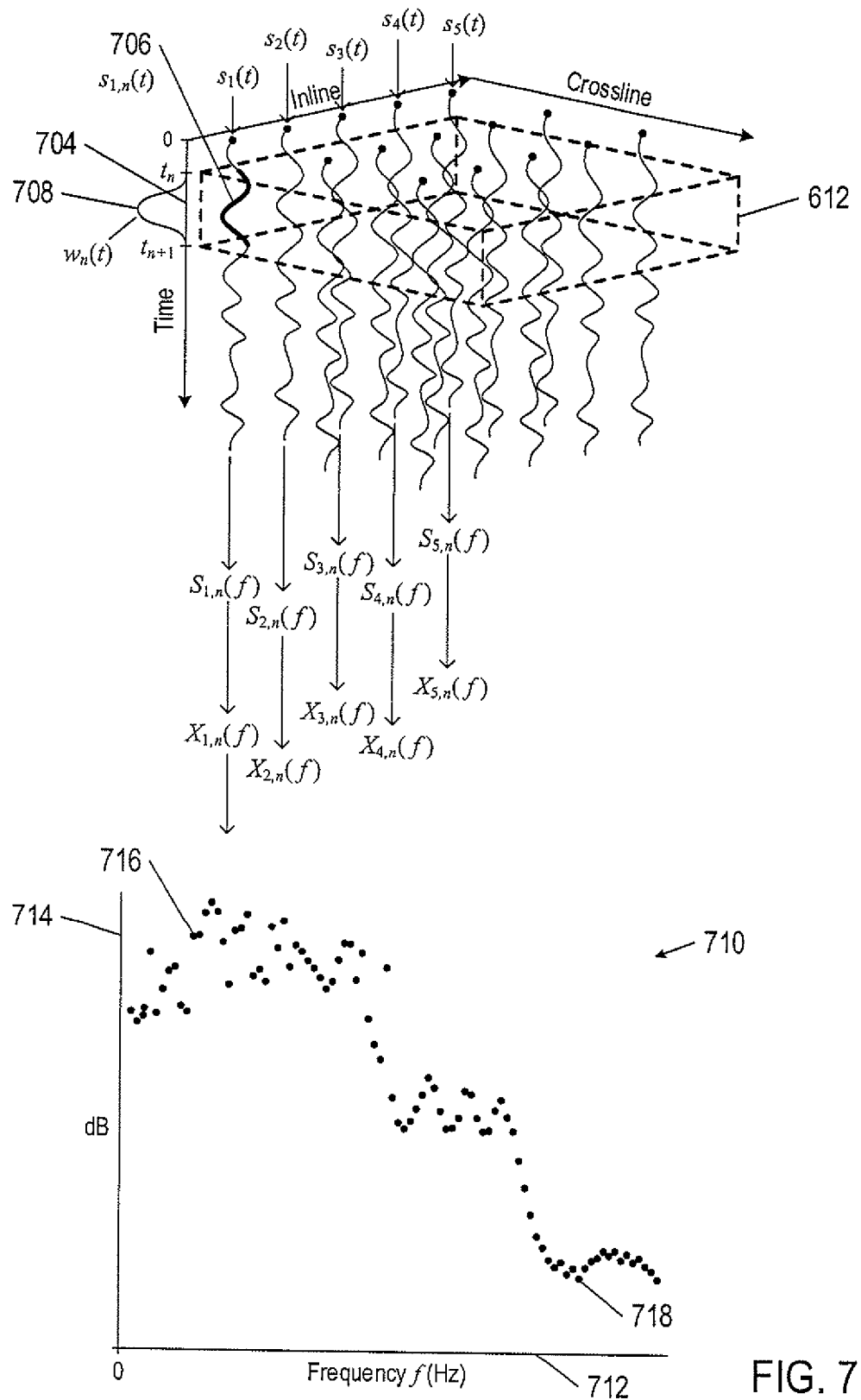
FIG. 7 shows an array of traces of migrated seismic data in a window of the volume shown in FIG. 6.

FIG. 7 shows a 3×5 array of 15 traces of migrated seismic data in the window 612 of FIG. 6. The window 612 encloses the 15 traces in the inline and crossline directions and contains the migrated seismic data points with time stamps that lie in a time interval $[t_n, t_{n+1}]$ 704 of the window 612, where index n a time window index, $t_n$ represents an initial time sample within the window 612, and $t_{n+1}$ represents a final time sample of the window 612. In this example, the window 612 is rectangular in the inline-crossline plane with $n_{SL}=5$ and $n_{XL}=3$. Highlighted section 706 of the trace $s_1(t)$ represents the migrated seismic data points of the trace with time stamps that lie in the time interval $[t_n, t_{n+1}]$ 704 of the window 612 and is denoted by $s_{1,n}(t)$. For each trace in the window 612, a tapered short-time Fourier transform is applied to the migrated seismic data points that lie within the time interval $[t_n, t_{n+1}]$ 704.

The tapered short-time Fourier transform applied to the n-th portion of migrated seismic data points of each trace that lie within the time interval $[t_n, t_{n+1}]$ 704 of the window 612 is represented as follows:

$$S_{j,n}(f) = F\{s_{j,n}(t)\} = \int_{t_n}^{t_{n+1}} s_{j,n}(t) w_n(t) e^{-i2\pi f t} dt \quad (2)$$

where $S_{j,n}(f)$ is the spectrum of the migrated seismic data points $s_{j,n}(t)$ in the time interval $[t_n, t_{n+1}]$ of the window 612;

t is a time sample in the time interval $[t_n, t_{n+1}]$;
f represents the frequency;
$w_n(t)$ represents a weight function; and
j is an index for traces within the window.

The weight function $w_n(t)$ can be any normalized function that tapers toward the initial and final time samples of the time interval $[t_n, t_{n+1}]$ 704 and that would sum to unity as follows:

$$\sum_{t=t_n}^{t_{n+1}} w_n(t) = 1$$

For example, in FIG. 7 curve 708 represents a weight function for the time interval 704 of the window 612. Examples of weight functions include, but are not limited to, a normalized Hann function, a normalized Hamming function, and a normalized Gaussian function. Computation of the tapered short-time Fourier transform represented by Equation (2) may be executed using a discrete Fourier transform ("DFT") or a Fast Fourier transform ("FFT"). A log spectrum of data points $s_{j,n}(t)$ may be computed from the spectrum $S_{j,n}(f)$ as follows:

$$X_{j,n}(f) = \log_a |S_{j,n}(f)|^2 \quad (3)$$

where a is the base of the logarithm (e.g., a=10).

For data points $s_{j,n}(t)$, the log spectrum $X_{j,n}(f)$ represents the distribution of power (i.e., energy per frequency) over a range of frequencies.

Returning to FIG. 7, FIG. 7 shows an example log spectrum 710 computed from the migrated seismic data points $s_{1,n}(t)$ in the time interval $[t_n, t_{n+1}]$. Horizontal axis 712 represents a range of frequencies. Vertical axis 714 represents a spectral power range. Dots, such as dot 716, represent log spectrum values at different frequencies for data points $s_{1,n}(t)$. The log spectrum $X_{1,n}(f)$ represents a distribution of power in data points $s_{1,n}(t)$ over a range of frequencies. In the log spectrum 710, log spectrum values are larger at lower frequencies, such as log spectrum value 716, than log frequency values at higher frequencies, such as log spectrum value 718, which indicates that lower frequency acoustic energy makes up larger portion of data points $s_{1,n}(t)$ that higher frequency acoustic energy. In FIG. 7, for the sake of illustration, only the log spectra $X_{1,n}(f)$, $X_{2,n}(f)$, $X_{3,n}(f)$, $X_{4,n}(f)$, and $X_{5,n}(f)$ are represented for the sets of migrated seismic data points $s_{1,n}(t)$, $s_{2,n}(t)$, $s_{3,n}(t)$, $s_{4,n}(t)$ and $s_{5,n}(t)$, respectively. In practice, a log spectrum $X_{j,n}(f)$, such as the example log spectrum 710, is computed for data points $s_{j,n}(t)$ from the portion of migrated seismic data points in the window 612, where j=1, 2, . . . , 15.

An average log spectrum of the migrated seismic data in a window of a volume of migrated seismic data is computed for each frequency f as follows:

$$X_n(f) = \frac{1}{N} \sum_{j=1}^{N} X_{j,n}(f) \quad (4)$$

where N is the number of log spectra computed from N traces with migrated seismic data points contained in the n-th window.

Figure 8:
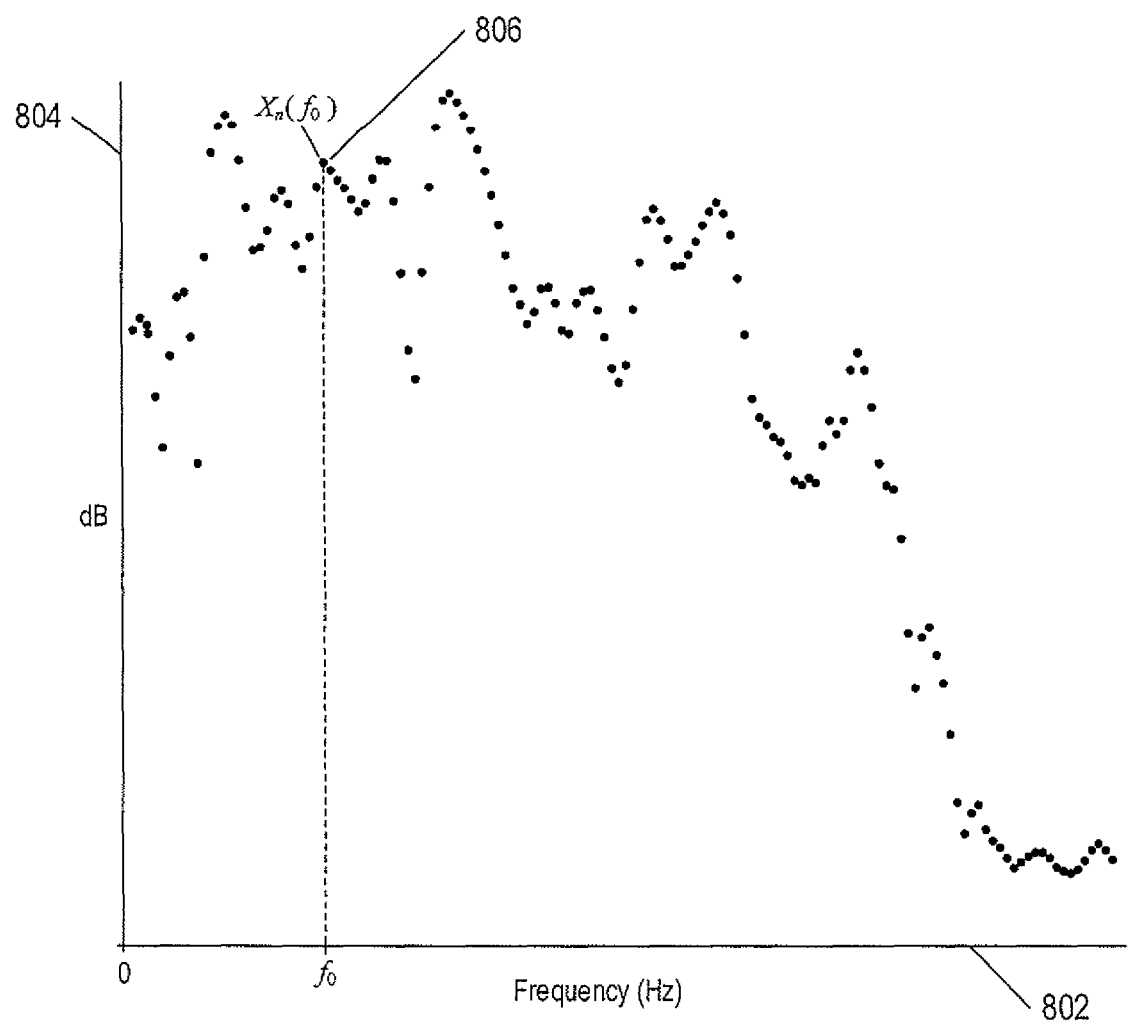
FIG. 8 shows an example average log spectrum of log spectra.

FIG. 8 shows an example average log spectrum of the log spectra obtained described above with reference to FIG. 7. Horizontal axis 802 represents a range of frequencies. Vertical axis 804 represents a spectral power range. Each dot represents an average log spectrum value (i.e., average power) of the migrated seismic data within the window 612 for a given frequency. For example, $X_n(f_0)$ 806 represents an average log spectrum value of the log spectra $X_{1,n}(f_0), \ldots, X_{15,n}(f_0)$ at the frequency $f_0$. The average log spectrum represents the average power distribution of the portions of the migrated seismic data within the window over a range of frequencies.

Smoothing is applied to the average log spectrum to obtain a pilot spectrum. Smoothing of the average log-spectrum may be carried out using any one of a number of different non-parametric regression techniques. An example of a non-parametric regression technique that may be used to compute values of a pilot spectrum at each frequency $f_0$ of the average log spectrum is a weighted local average of the average log spectrum values:

$$Y_n(f_0) = \sum_{f_m \in N_0} q_m X_n(f_m) / \sum_{f_m \in N_0} q_m \tag{5}$$

where
$N_0 = \{f_m = f_0 + m\Delta f: m = -M, -M+1, \ldots, -2, -1, 0, 1, 2, \ldots, M-1, M\}$ is a neighborhood of frequencies around $f_0$ and $\Delta f$ is the frequency sampling interval between samples given by:

$$\Delta f = \frac{1}{\Delta t \times \text{number of FFT samples}}$$

with $\Delta t$ is the sampling rate time interval between samples.

The weights associated with each average log spectrum value in the neighborhood $N_0$ are computed using a kernel function given by:

$$q_m = K\left[\frac{f_m - f_0}{h}\right]$$

The parameter h is a kernel bandwidth numerical value between 0.1 Hz and 4 Hz. An example of a kernel that can be used is the Gaussian kernel defined as $$K[z] = \frac{1}{\sqrt{2\pi}} e^{-z^2/2}$$

where $$z = \frac{f_m - f_0}{h}$$

Alternatively, the kernel function may be a rectangular kernel function given by:

$$K[z] = \begin{cases} 1 & \text{for } |z| < 1 \\ 0 & \text{for } |z| \geq 1 \end{cases}$$

which gives equal weight to each average log spectrum value in the window of kernal bandwidth h centered at frequency $f_0$.

Figure 9:
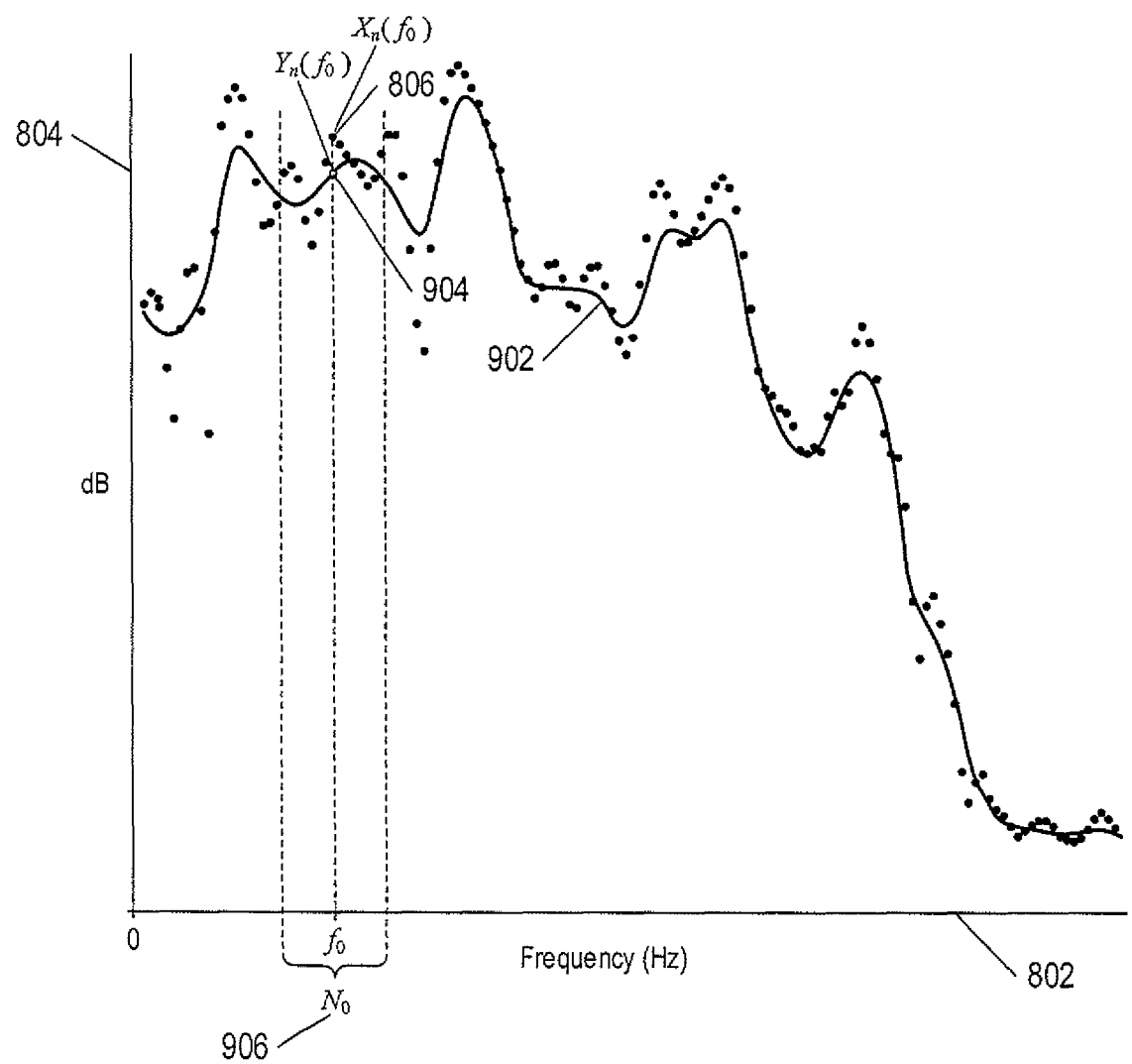
FIG. 9 shows a smooth pilot spectrum computed from an average log spectrum.

FIG. 9 shows a curve 902 that represents a smooth shape of pilot spectrum values by comparison with the scattered average log spectrum values. A pilot spectrum value $Y_n(f)$ of the pilot spectrum 1002 is computed for each average log spectrum value $X_n(f)$ of the average log spectrum. Open dot 1004 represents pilot spectrum value $Y_n(f)$ computed from 15 (M=7) average log spectrum values in a neighborhood $N_0$ 1006 of the average log spectrum value $X_n(f)$. Other pilot spectrum values computed from the average log spectrum are located along the curve 902. The pilot spectrum 902 is a smooth approximation of the average power of the migrated seismic data located within the window 612 over a range of frequencies.

Spectral enhancement includes determining a useful frequency bandwidth of the migrated seismic data in the window 612. The useful frequency bandwidth of the migrated seismic data in the window 612 is determined by fitting a Ricker spectrum of the Ricker wavelet to the average log spectrum of the migrated seismic data in the window 612. The Ricker spectrum is given by:

$$R_n(f) = C_n \left(\frac{f}{f_{D,n}}\right)^2 \exp\left(-\left(\frac{f}{f_{D,n}}\right)^2\right) \tag{6a}$$

where $C_n$ is a constant and $f_{D,n}$ is the dominant frequency of the Ricker wavelet.

The parameters $C_n$ and $f_{D,n}$ are determined by minimizing $$\sum_f |X_n(f) - R_n(f)|^2 \tag{6b}$$

with respect to $C_n$ and $f_{D,n}$ over the range of frequencies.

Figure 10:
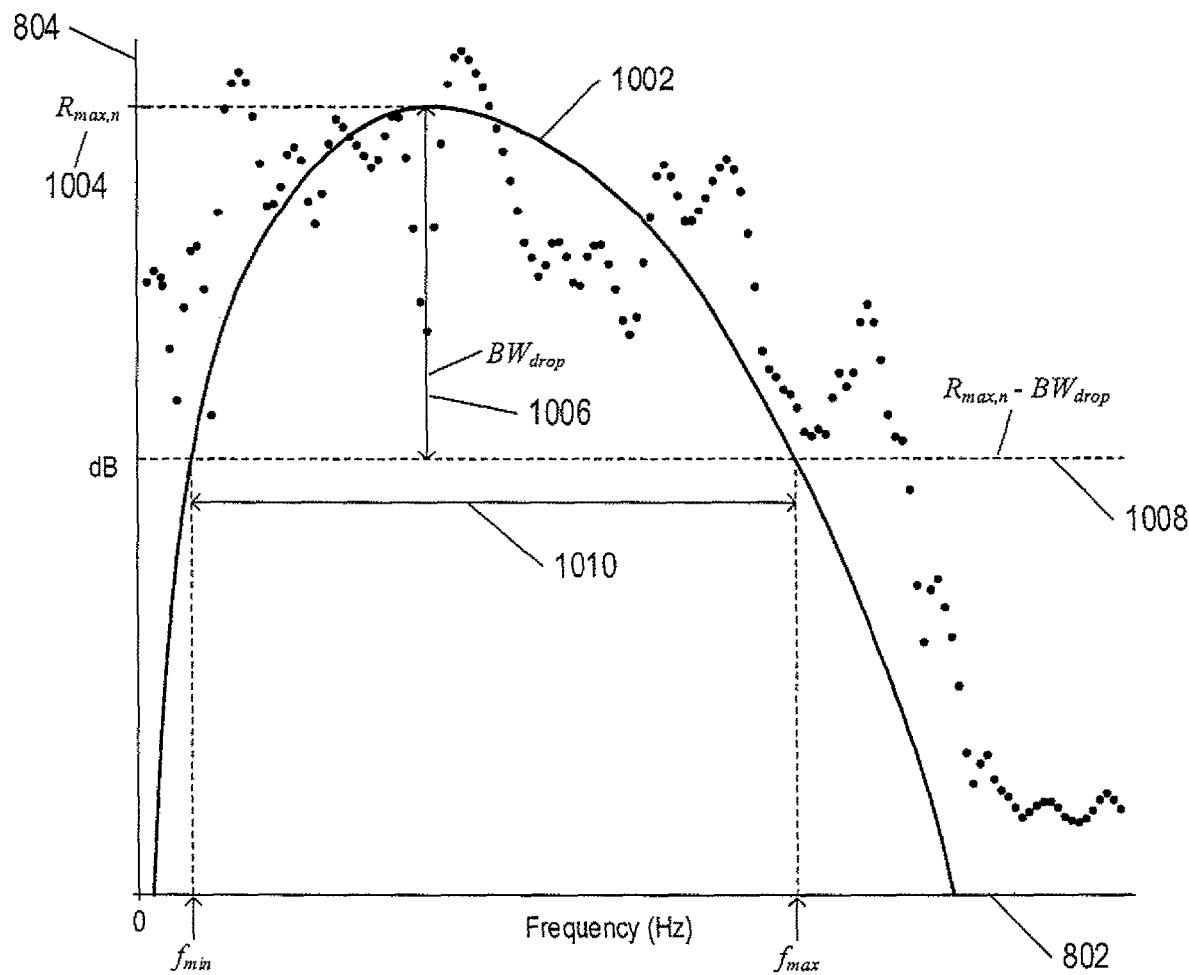
FIG. 10 shows a plot of an example Ricker spectrum fit to the average log spectrum shown in FIG. 8.

FIG. 10 shows a curve 1002 that represents a Ricker spectrum fit to the average log spectrum shown in FIG. 8. The maximum value $R_{max,n}$ 1004 of the Ricker spectrum 1002 may be computed from the Ricker spectrum in Equation (6a) (i.e., compute $R_{max,n}=R(f')$ where $d\,R_n(f)/df=0$). Directional arrow 1006 represents a bandwidth drop, denoted by $BW_{drop}$, that is subtracted from the maximum value $R_{max,n}$ to determine a range of frequencies with the largest concentration of power in the average log spectrum. The bandwidth drop $BW_{drop}$ drop may be a user defined parameter. For example, the bandwidth drop may be 10 dB, 15 dB, 20 dB, or 25 dB or any value between 10 dB and 25 dB. This range of frequencies is the useful frequency bandwidth of the average log spectrum and, as shown in FIG. 10, corresponds to the portion of the log average spectrum with the largest average log spectrum values. In other words, the useful frequency bandwidth corresponds to a range of frequencies 1010 with the largest power contribution to the migrated seismic data contained within the window 612. Frequencies where the Ricker spectrum intersects the bandwidth drop $BW_{drop}$ from the maximum value $R_{max,n}$ represented by dashed line 1008 are the lower and upper limits of the useful frequency bandwidth. In FIG. 10, minimum frequency $f_{min}$ and maximum frequency $f_{max}$ limits of the useful frequency bandwidth may be computed from the equation $$R_{max,n} - BW_{drop} = R_n(f) \tag{7}$$

Directional arrow 1010 represents the width of the useful frequency bandwidth $[f_{min}, f_{max}]$ over the range of frequencies.

In order to flatten output the pilot spectrum for the n-th window in the useful frequency bandwidth, a weighted pilot spectrum is computed for the n-th window by defining $$Z_n(f) = Y_n(f) + W_n(f) \tag{8}$$

where $Y_n(f)$ is the pilot spectrum given by Equation (5) over the useful frequency bandwidth with $f \in [f_{min}, f_{max}]$; and $W_n(f)$ are spectral weights over the useful frequency bandwidth $f \in [f_{min}, f_{max}]$.

In order to avoid over boosting the average log spectrum, the spectral weights are computed by applying constrained optimization to a loss function given by:

$$L_n = \min_{W(f)} \int_{f_{min}}^{f_{max}} \left| \frac{dZ_n(f)}{df} \right| df \tag{9a}$$

The n-th window loss function is discretized and linked to the pilot spectrum $Y_n(f)$ and the unknown spectral weights $W_n(f)$ as follows:

$$L_n = \min_{W_n(f)} \sum_{m=m_1}^{m=m_2} |Z_n(m) - Z_n(m-1)|_1 \tag{9b}$$
$$= \min_{W_n(f)} \sum_{m=m_1}^{m=m_2} |Y_n(m) + W_n(m) - Y_n(m-1) - W_n(m-1)|_1$$

where $|\cdot|_1$ denotes the absolute value or $L_1$ norm;

$m_1$ and $m_2$ and positive integers ($m_1 \neq m_2$);

$f_{min} = m_1 \Delta f$; and $f_{max} = m_2 \Delta f$.

Constrained optimization of the loss function is executed with frequencies in the useful frequency bandwidth:

$$f_{min} \leq f \leq f_{max}$$

and the spectral weights constrained as follows:

$$0 \leq W_n(f) \leq \text{Max\_boost}$$

where Max_boost is the maximum allowed spectral boost. The maximum allowed spectral boost determines the maximum boost that may be applied to the spectra of the migrated seismic data contained within the window 612. The maximum allowed spectral boost may be a user defined value. For example, the maximum allowed spectral boost may be 10 dB, 15 dB, 20 dB, or 25 dB or any value between 10 dB and 25 dB.

Figure 11:
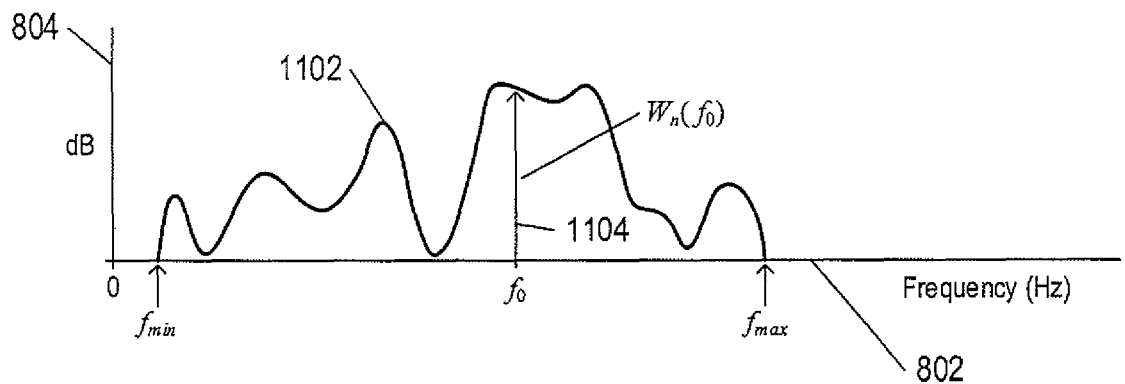
FIG. 11 shows a plot of example spectral weights over a useful frequency bandwidth.

FIG. 11 shows a plot of example spectral weights computed using constrained optimization described above with reference to Equation (9). Curve 1102 represents spectral weight values over the useful frequency bandwidth $[f_{min}, f_{max}]$. Directional arrow 1104 represents the spectral weigh value $W_n(f_0)$ at a frequency $f_0$ in the useful frequency bandwidth $[f_{min}, f_{max}]$. When the spectral weights are added to the pilot spectrum, spectral weights flatten the pilot spectrum over the useful frequency bandwidth.

Figure 12:
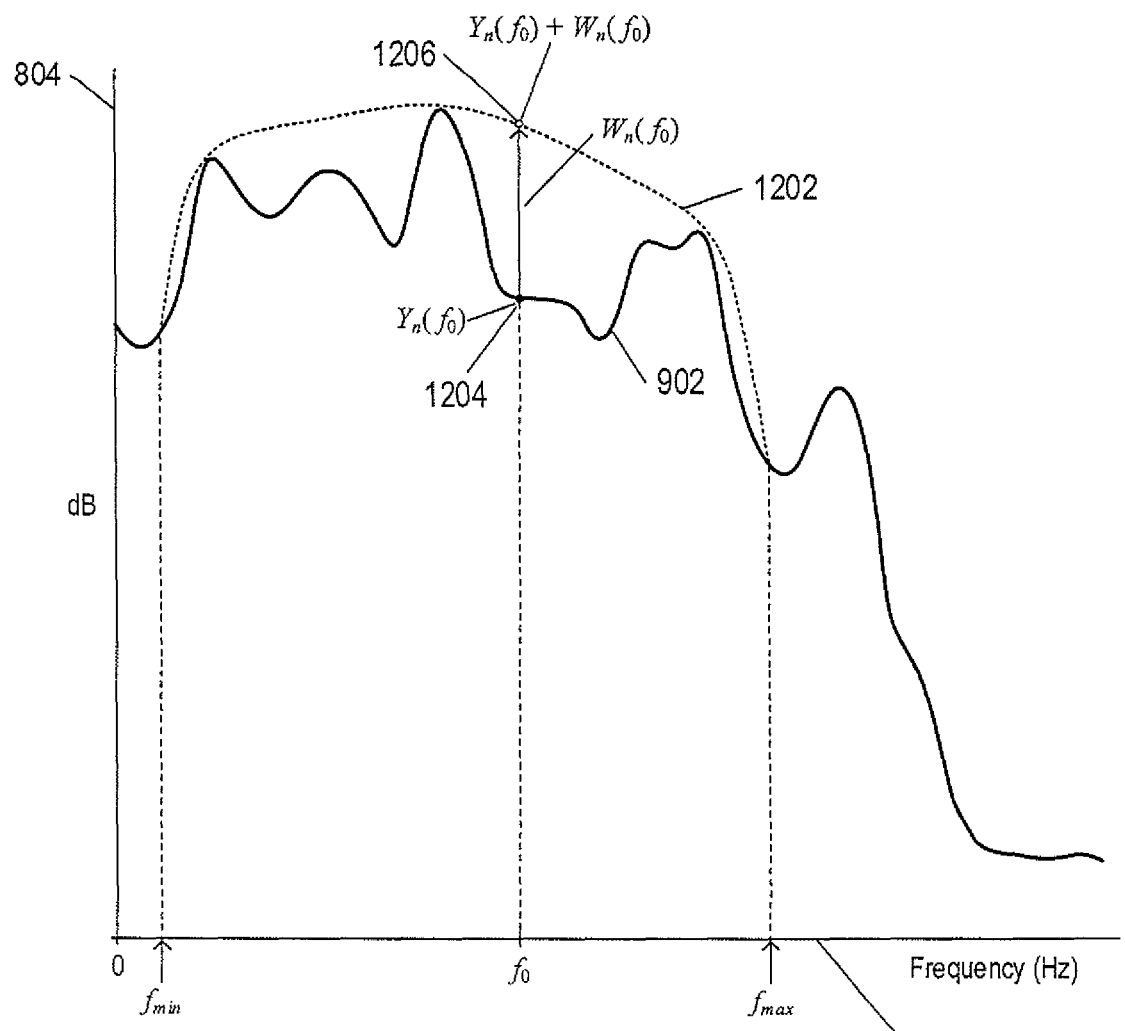
FIG. 12 shows a plot of a flattened pilot spectrum.

FIG. 12 shows a plot of a flattened pilot spectrum. Dotted curve 1202 represents a flattened pilot spectrum with the spectral weights shown in FIG. 11 added to the pilot spectrum 1002 over the useful frequency bandwidth $[f_{min}, f_{max}]$. Dot 1204 represents a pilot spectrum value $Y_n(f_0)$ at a frequency $f_0$. Open dot 1206 represents a flattened pilot spectrum value $Y_n(f_0) + W_n(f_0)$ obtained by addition of the spectral weight $W_n(f_0)$. The flattened pilot spectrum is given by:

$$Y_n^F(f) = \begin{cases} Y_n(f) + W_n(f) & \text{for } f_{min} \leq f \leq f_{max} \\ Y_n(f) & \text{for } f < f_{min} \text{ and } f_{max} > f \end{cases} \tag{10}$$

The spectral weights are added to a log spectrum of migrated seismic data points of a target within the window 612 in the frequency domain in order to smooth and boost the log spectrum of the target trace over the useful frequency bandwidth. The log spectrum of the data points of the target trace within the window 612 may be transformed from the frequency domain to the time domain to obtain a spectrally enhanced target trace.

Figure 13:
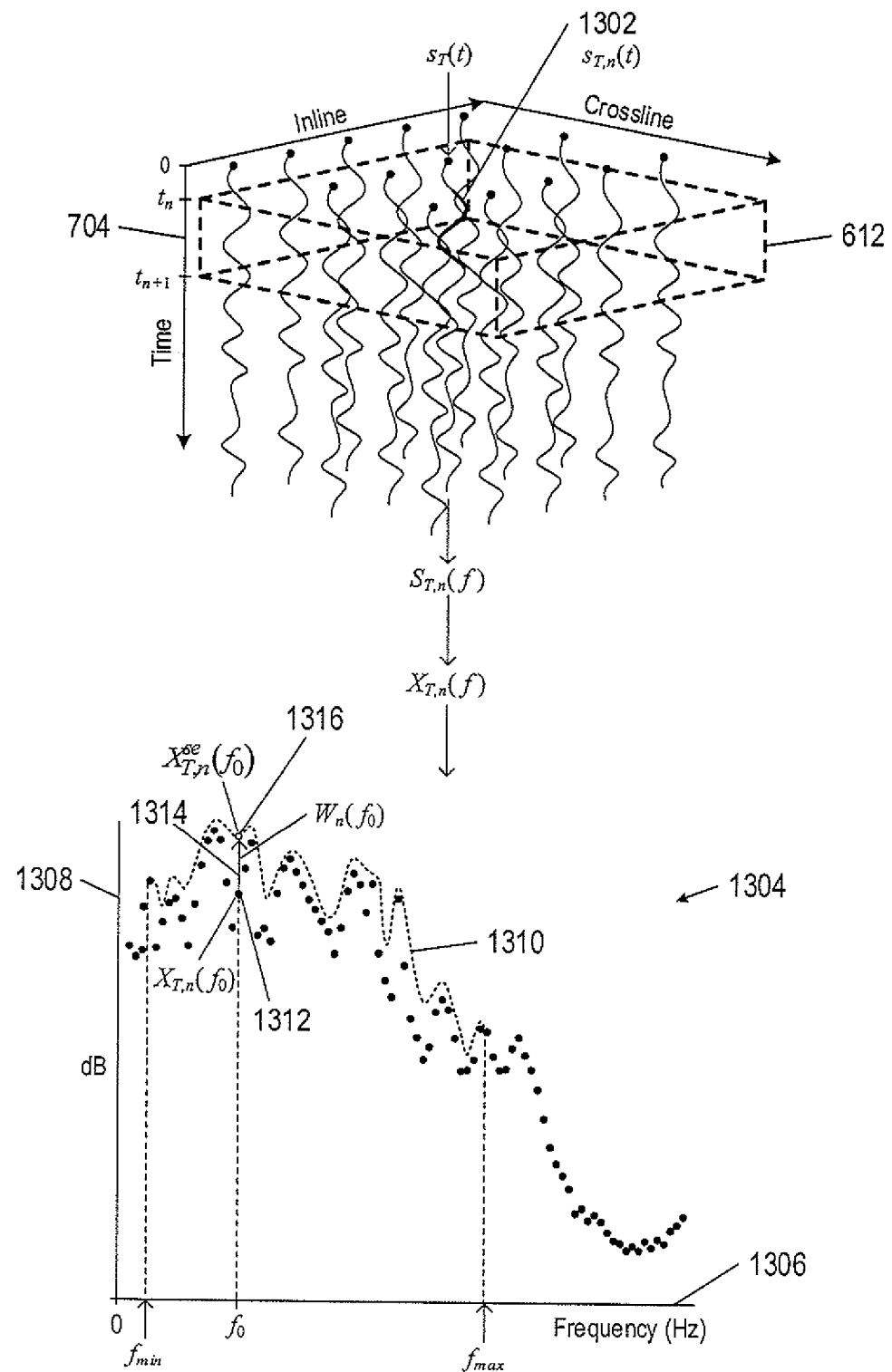
FIG. 13 shows an example log spectrum computed for a target trace within a window of the volume shown in FIG. 6.

FIG. 13 shows the 3×5 array of 15 traces of migrated seismic data within the window 612 described above with reference to FIG. 7. In this example, a target trace, $s_T(t)$, is located at the center of the 3×5 array of 15 traces. Highlighted section 1302 of the target trace $s_T(t)$ represents migrated seismic data points, $s_{T,n}(t)$, within the time interval $[t_n, t_{n+1}]$ 704, which are transformed from the space-time domain using a tapered short-time Fourier transform to obtain a spectrum $S_{T,n}(f) = F\{s_{T,n}(t)\}$. A log spectrum $X_{T,n}(f)$ of the target trace migrated seismic data points $s_{T,n}(t)$ is computed as described above with reference to Equation (3). FIG. 13 shows an example log spectrum 1304 of the migrated seismic data points $s_{T,n}(t)$. Horizontal axis 1306 represents a range of frequencies. Vertical axis 1408 represents a power range. Log spectrum values over the range of frequencies for the data points $s_{T,n}(t)$ are represented by dots, as described above with reference to the log spectrum 710 of the data points $s_{1,n}(t)$ in FIG. 7. The spectral weights $W_n(f)$ computed from the migrated seismic data in the window 612, as described above with reference to Equation (9), are added to the log spectrum 1304 over the useful frequency bandwidth to obtain a spectrally enhanced log spectrum given by:

$$X_{T,n}^{se}(f) = \begin{cases} X_{T,n}(f) + W_n(f) & \text{for } f_{min} \leq f \leq f_{max} \\ X_{T,n}(f) & \text{for } f < f_{min} \text{ and } f_{max} > f \end{cases} \tag{11}$$

Dashed curve 1310 represents spectral weights added to the log spectrum 1304 over the useful frequency bandwidth $[f_{min}, f_{max}]$. For example, dot 1312 represents a log spectrum value $X_{T,n}(f_0)$ at a frequency $f_0$ in the useful frequency bandwidth $[f_{min}, f_{max}]$. Directional arrow 1314 represents a spectral weight $W_n(f_0)$ at the frequency $f_0$. Open dot 1316 represents a spectrally enhanced log spectrum value $X_{T,n}^{se}(f_0)$ at the frequency $f_0$ obtained by adding the spectral weight $W_n(f_0)$ to the log spectrum value $X_{T,n}(f_0)$. Note that $X_{T,n}^{se}(f)$ is called a spectrally enhanced log spectrum over the full range of frequencies even though spectral weights are added with the useful frequency bandwidth.

The spectrally enhanced log spectrum is transformed from frequency domain back to the time domain by first computing a spectrally enhanced spectrum:

$$S_{T,n}^{se} = \begin{cases} |S_{T,n}(f)| a^{W(f)/2} & \text{for } f_{min} \leq f \leq f_{max} \\ |S_{T,n}(f)| & \text{for } f < f_{min} \text{ and } f_{max} > f \end{cases} \tag{12}$$

Applying the inverse tapered short-time Fourier transform to the spectrally enhanced spectrum of Equation (12) to the space-time domain gives spectrally enhanced migrated seismic data points of the target trace within the time interval $[t_n, t_{n+1}]$ of the window 612 as follows:

$$S_{T,n}^{se} = F^{-1}\{S_{T,n}^{se}(f)\} = \frac{1}{2\pi w_n(t)}\int_0^{f_{Ny}} S_{T,n}^{se}(f)e^{ift}df \qquad (13)$$

where $f_{Ny}$ is the largest frequency over the range of frequencies.

The inverse tapered short-time Fourier transform may be executed using an inverse DFT or an inverse FFT. The spectrally enhanced migrated seismic data points $s_{T,n}^{se}(t)$ replace the migrated seismic data points $s_{T,n}(t)$ of the target trace $s_T(t)$.

Returning to FIG. 6, the window 612 is moved within the volume 600 in space and time with overlap of migrated seismic data points in a previous location of the window. In other words, each location of the window overlaps with migrated seismic data points contained within a previous location of the window. The computational operations described above with reference to FIGS. 7-13 and Equations (1)-(13) are repeated for the migrated seismic data points of traces contained within the window at each location of the window within in the volume 600.

Figure 14A:
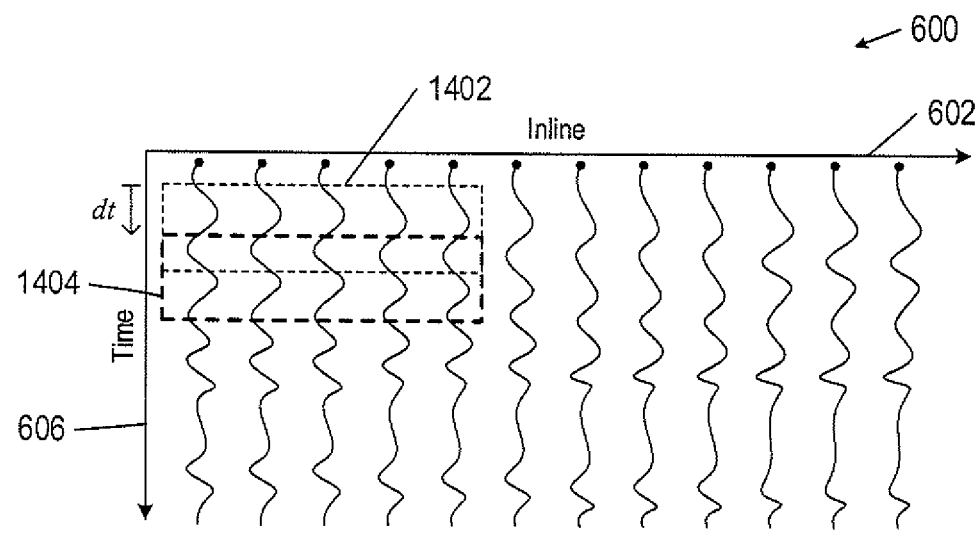
FIG. 14A shows a side-elevation view of an inline-time plane of the volume shown in FIG. 6.

FIG. 14A shows a side-elevation view of the inline-time plane of the volume 600. Dotted-line rectangle 1402 represents a side-elevation view of the location of the window 612. The window 612 contains migrated seismic data points of 5 traces. Dashed-line rectangle 1404 represents a location of the window after movement of the window within the volume 600 by a time increment denoted by dt. Note that the length of the time increment, dt, the window is moved by is less than the time width of the window. For example, the time interval may be equal to half the length of the time interval of the window. In other implementations, the time interval may be less than half the length of the time interval. As a result, each location of the window overlaps in time with 50% or more of migrated seismic data contained in the previous location of the window.

Figure 14B:
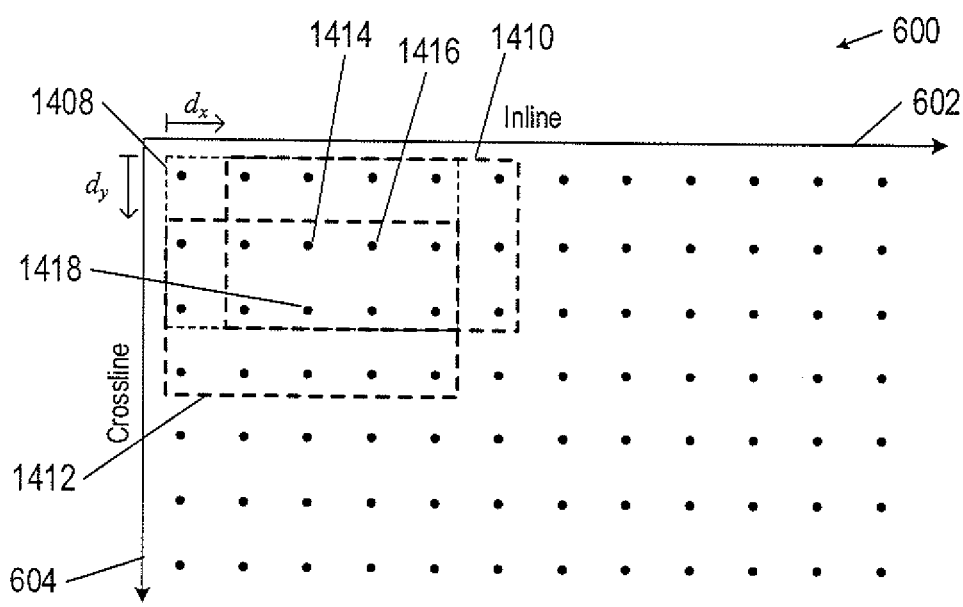
FIG. 14B shows a top-elevation view of the inline-crossline plane of the volume shown in FIG. 6.

FIG. 14B shows a top-elevation view of the inline-crossline plane of the volume 600. Dotted-line rectangle 1408 represents the location of the window that contains migrated seismic data points of a 3×5 array of traces of migrated seismic data. Dashed-line rectangle 1410 represents a location of the window after movement within the volume 600 by an inline distance denoted by $d_x$. Dashed-line rectangle 1412 represents a location of the window after movement within the volume 600 by a crossline distance denoted by $d_y$. The lengths of the inline distance, $d_x$, and of crossline distance, $d_y$, are less than the inline and crossline widths, respectively, of the window such that the locations 1410 and 1412 of the window contain migrated seismic data points of traces that were contained in the previous location 1408 of the window. In particular, the distances $d_x$ and $d_y$ are less than the distances between the regularized coordinates in the inline and crossline directions. The methods described above with reference to FIGS. 7-13 are repeated for the centrally located target trace 1414 of the window location 1408, for the centrally located target trace 1416 of the window location 1410, and the centrally located target trace 1418 of the window location 1412.

Figure 15:
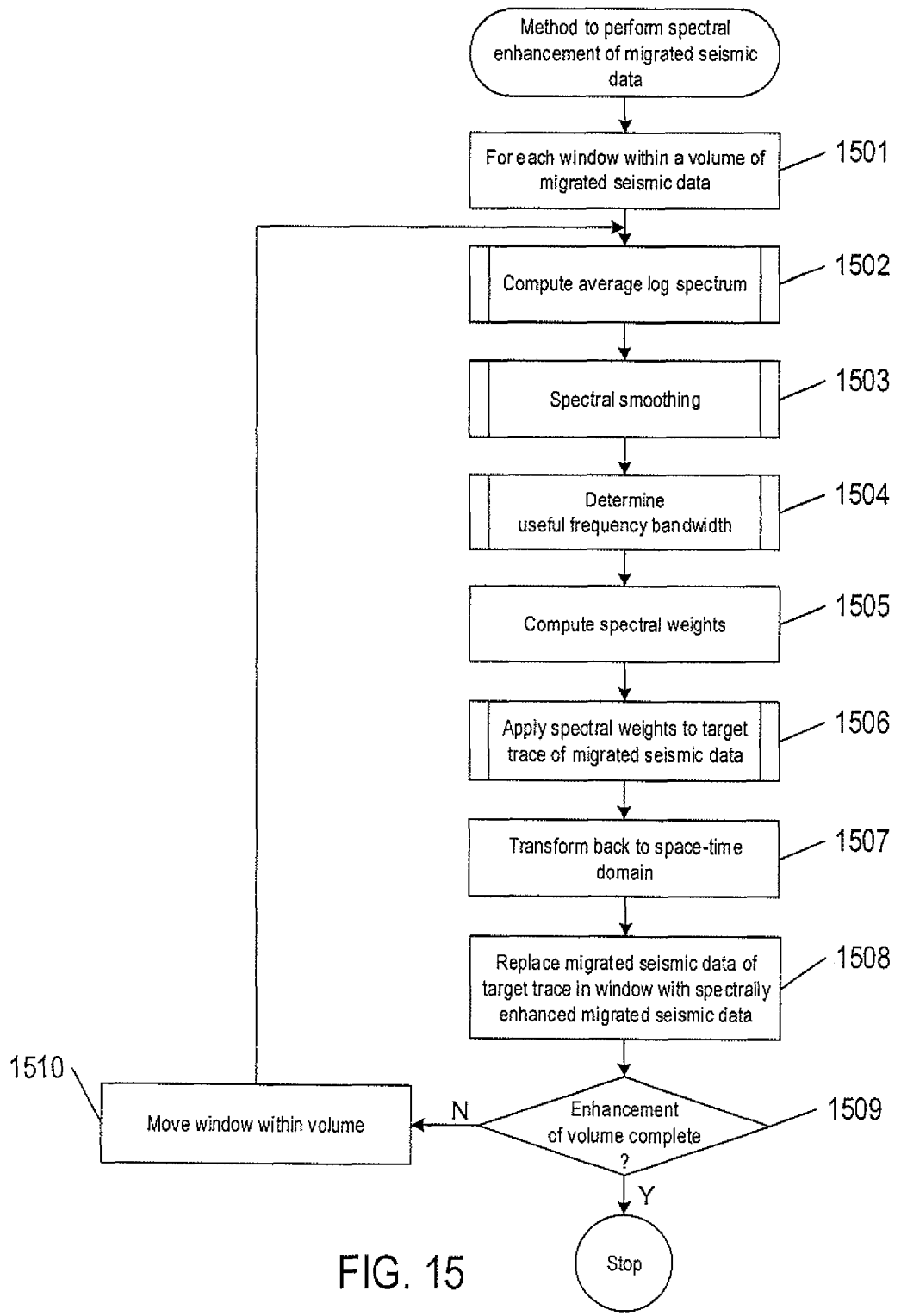
FIG. 15 shows a method to perform spectral enhancement of migrated seismic data.

FIG. 15 shows a method to perform spectral enhancement of migrated seismic data. The method is composed of computer implemented modules, or routines, each comprising a series of machine-readable instructions stored in one or more data-storage devices and executed using one or more processors of a computer system described below with reference to FIG. 20. A loop beginning with block 1502 repeats the computational operations represented by blocks 1502-1508 for each window of a volume of migrated seismic data, such as the window 612 in FIG. 6. In block 1502, a "compute average log spectrum" module is called to compute an average log spectrum of the migrated seismic data contained within the window. In block 1503, a "spectral smoothing" module is called to perform spectral smoothing of the average log spectrum. The spectrally smoothed average log spectrum is a pilot spectrum of the average log spectrum, as described above with reference to FIG. 9. In block 1504, a "determine useful frequency bandwidth" module is called to compute the useful frequency bandwidth of the average log spectrum. In block 1505, a "compute spectral weights" module is called to compute spectral weights of the pilot spectrum over the useful frequency bandwidth as described above with reference to Equation (9). In block 1506, an "apply spectral weights to target trace of migrated seismic data" module is called to compute a spectrally enhanced log spectrum of the migrated seismic data points of a target trace contained in the window. In block 1507, the spectrally enhance log spectrum of migrated seismic data of the target trace is transformed back to the space-time domain to obtain a spectrally enhanced migrated seismic data of the target trace in the window as described above with reference to Equations (12) and (13) and FIG. 13. In block 1508, the migrated seismic data of the target trace in the window is replaced by the spectrally enhanced migrated seismic data. In decision block 1509, when spectral enhancement of the volume of migrated seismic data is not complete, control flows to block 1510. In block 1510, the location of the window is moved with overlap of a previous location of the window, as described above with reference to FIGS. 14A-14B. When spectral enhancement of the volume of migrated seismic data is complete, one of a number of seismic imaging techniques may be applied to the volume of spectrally enhanced migrated seismic data to obtain an image of a subterranean formation.

Figures 16, 17:
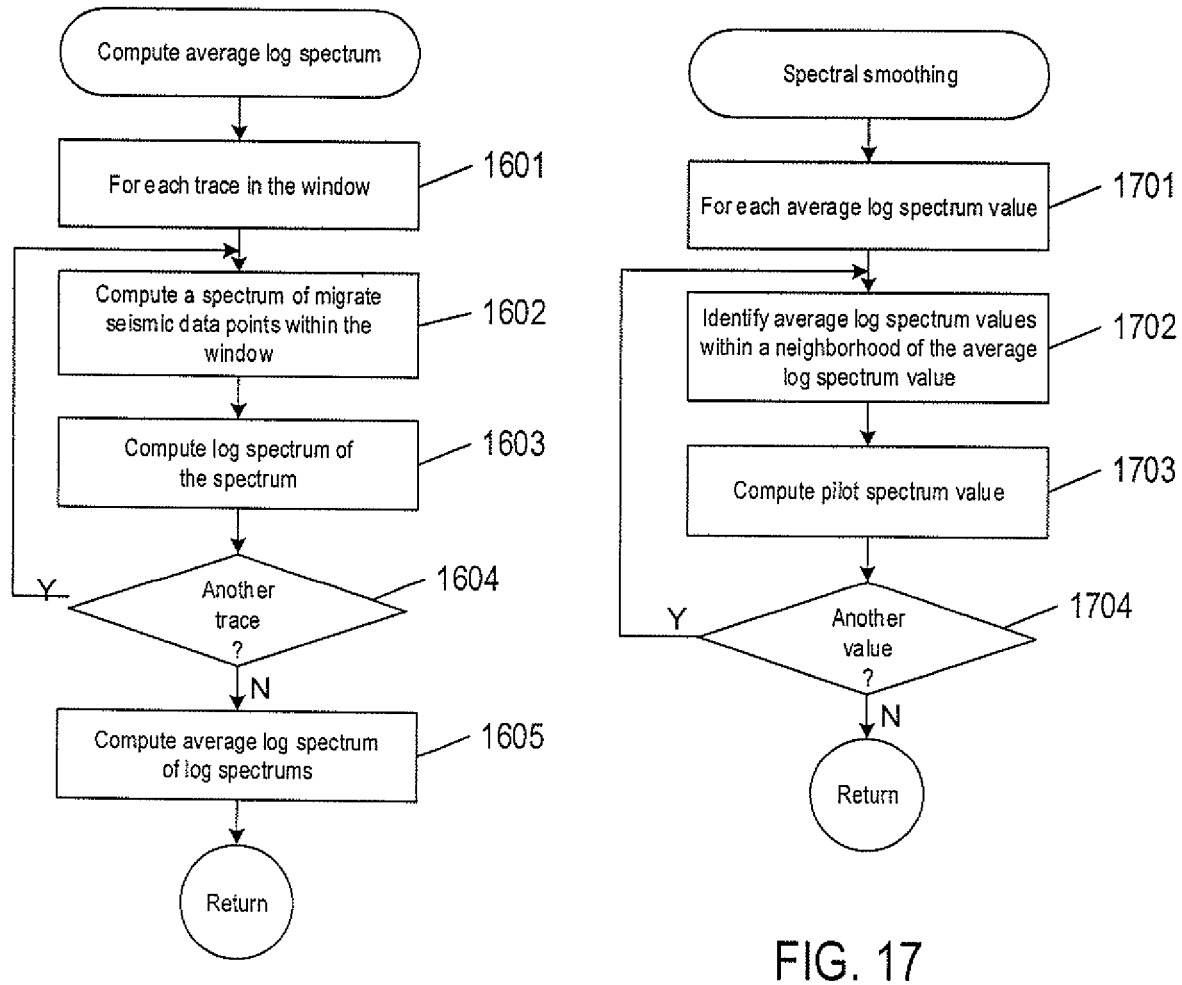
FIG. 16 shows a control-flow diagram of the "average log spectrum" module called in FIG. 15.
FIG. 17 shows a control-flow diagram of the "spectral smoothing" module called in FIG. 15.

FIG. 16 shows a control-flow diagram of the "compute average log spectrum" module called in block 1502 of FIG. 15. A loop beginning with block 1601 repeats the computational operations represented by blocks 1602-1603. In block 1602, a spectrum is computed using a tapered short-time Fourier transform applied to the trace of migrated seismic data as described above with reference to Equation (2) and FIG. 7. In block 1603, a log spectrum of the spectrum is computed as described above with reference to Equation (3). In decision block 1604, blocks 1603 and 1604 are repeated for another trace contained within the window. Otherwise, control flows to block 1605. In block 1605, an average log spectrum is computed from the log spectra as described above with reference to Equation (4) and FIG. 8.

FIG. 17 shows a control-flow diagram of the "spectral smoothing" module called in block 1503 of FIG. 15. A loop beginning with block 1701, repeats the computational operations represented by blocks 1702 and 1703 for each average log spectrum value in the average log spectrum computed in block 1502 of FIG. 15. In block 1702, average log spectrum values with a neighborhood of the average log spectrum value are identified. In block 1703, a pilot spectrum value is computed from the average log spectrum values in the neighborhood of the average log spectrum value as described using non-parametric regression as described above with reference to Equation (5). In a decision block 1704, blocks 1702 and 1703 are repeated for each average log spectrum value in the average log spectrum.

FIG. 18 shows a control-flow diagram of the "determine useful frequency bandwidth" module called in block 1504 of FIG. 15. In block 1801, a Ricker Spectrum is fit to the average log spectrum as described above with reference to Equation (6) and FIG. 10. In block 1802, a maximum value of the Ricker spectrum is computed as described above with reference to FIG. 10. In block 1803, a bandwidth drop is subtracted from the maximum value of the Ricker spectrum as described above with reference to FIG. 10. In block 1804, equate bandwidth drop from maximum value of Ricker spectrum with the Ricker spectrum as described above with reference to Equation (7). In block 1805, minimum and maximum frequencies of a useful frequency bandwidth are computed as described above with reference to Equation (7).

FIG. 19 shows a control-flow diagram of the "apply spectral weights to target trace of migrated seismic data" module called in block 1506 of FIG. 15. A loop beginning with block 1901 repeats the computational operations represented by blocks 1902-1904 for each log spectrum value of a target trace of the traces contained in the window. The log spectrum of the target trace is computed in block 1603 of FIG. 16. In decision block 1902, when the frequency of the log spectrum value of the target trace is within the useful frequency bandwidth, control flows to block 1903. Otherwise, control flows to decision block 1904. In block 1903, the spectral weight at the frequency obtained in block 1505 of FIG. 15 is added to the log spectrum value of the target trace as described above with reference to Equation (11) and FIG. 13 to obtain the spectrally enhanced log spectrum. In decision block 1904, blocks 1902 and 1903 are repeated for another log spectrum value of the log spectrum of the target trace.

Figure 20:
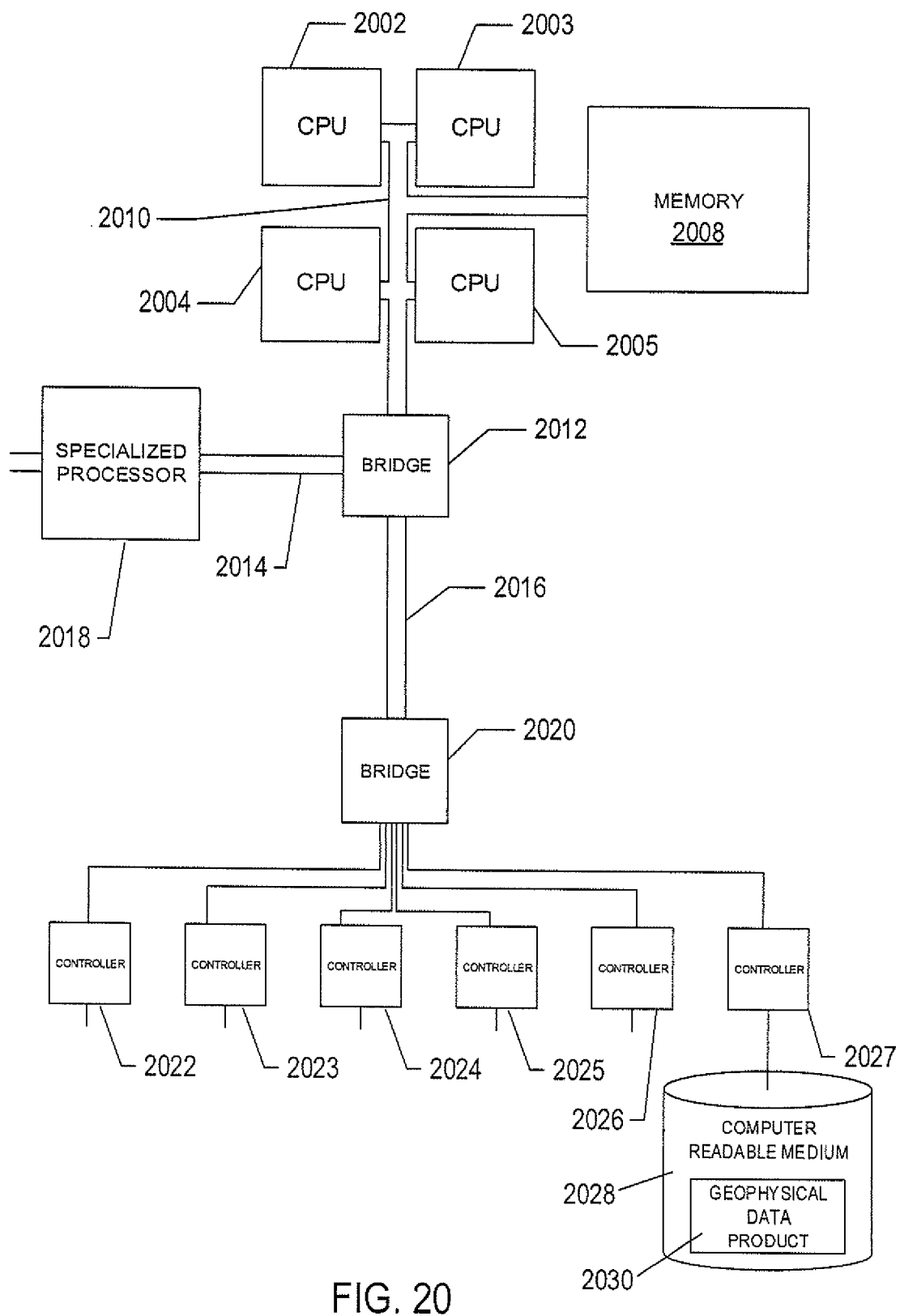
FIG. 20 shows an example of a generalized computer system that executes efficient methods for generating an image of subterranean formation.

FIG. 20 shows an example of a computer system that executes efficient methods for generating an image of subterranean formation and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this architecture. The computer system contains one or multiple central processing units ("CPUs") 2002-2005, one or more electronic memories 2008 interconnected with the CPUs by a CPU/memory-subsystem bus 2010 or multiple busses, a first bridge 2012 that interconnects the CPU/memory-subsystem bus 2010 with additional busses 2014 and 2016, or other types of high-speed interconnection media, including multiple, high-speed serial interconnects. The busses or serial interconnections, in turn, connect the CPUs and memory with specialized processors, such as a graphics processor 2018, and with one or more additional bridges 2020, which are interconnected with high-speed serial links or with multiple controllers 2022-2027, such as controller 2027, that provide access to various different types of computer-readable media, such as computer-readable medium 2028, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2028 is a data-storage device, including electronic memory, optical or magnetic disk drive, USB drive, flash memory and any other data-storage device. The computer-readable medium 2028 can be used to store machine-readable instructions that encode the modules and routines of the computational methods described above and can be used to store encoded data, during store operations, and from which encoded data can be retrieved, during read operations, by computer systems, data-storage systems, and peripheral devices.

Figure 21A:
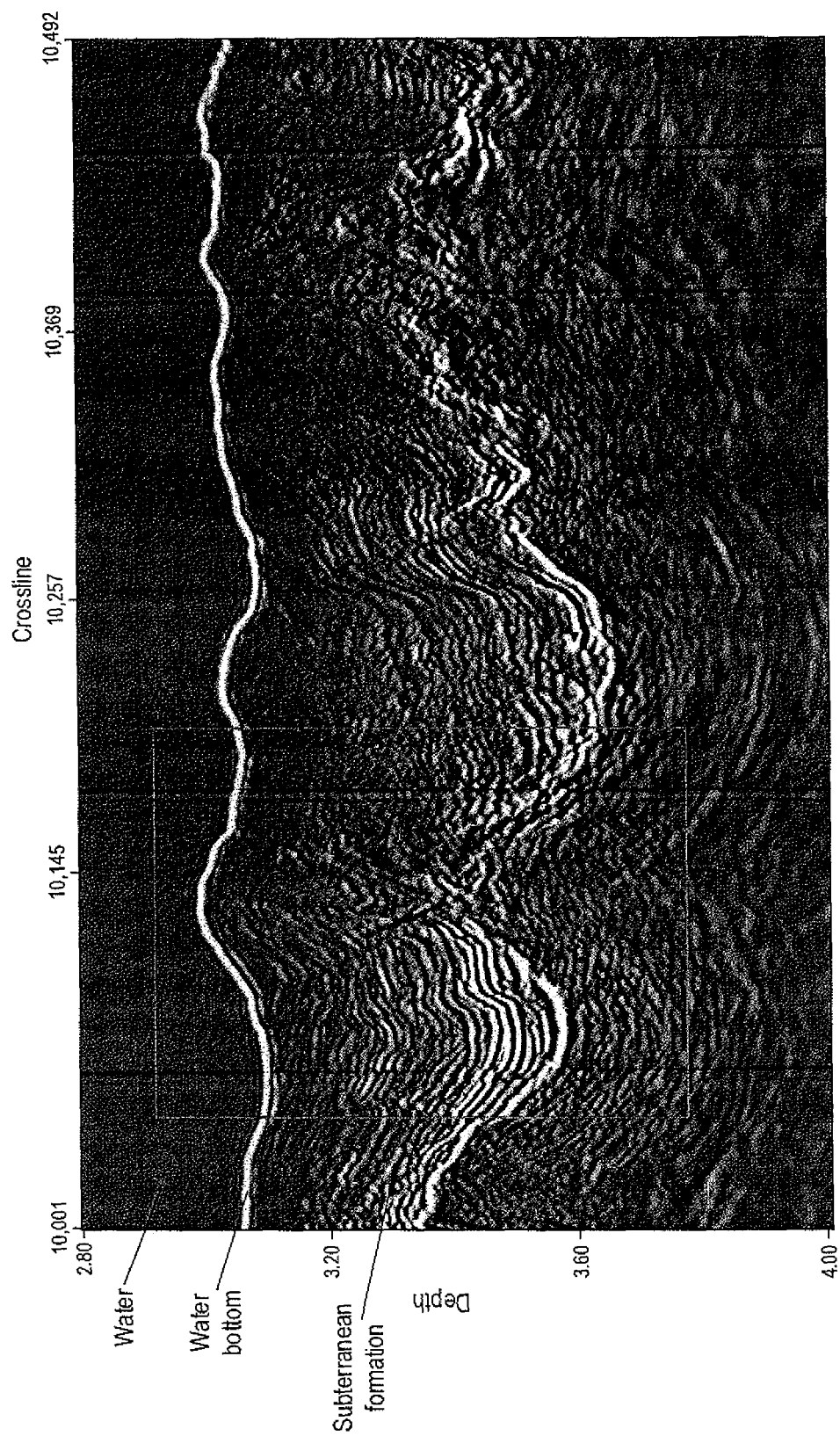
FIGS. 21A-21B show two two-dimensional images of the same region of a subterranean formation without and with spectral enhancement, respectively.
Figure 21B:
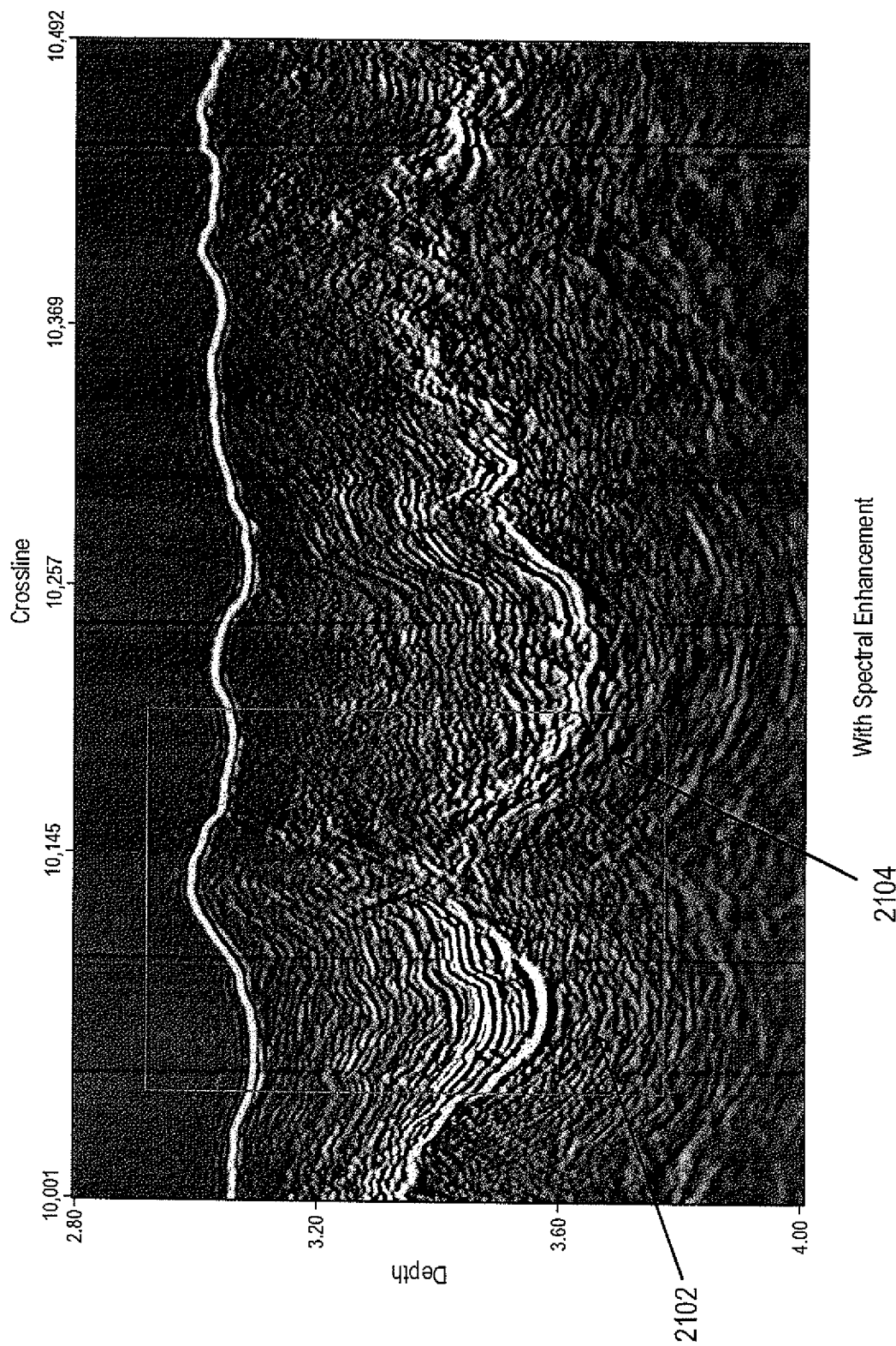

FIG. 21A shows a two-dimensional depth-crossline plane view of an image of a subterranean formation computed as described above with reference to FIG. 5 but without spectral enhancement of the seismic data. The image reveals the body of water, water bottom or floor, and the layered structure of the subterranean formation. By contrast, FIG. 21B shows a two-dimensional depth-crossline plane view of an enhanced image of the section of the subterranean formation shown in FIG. 21A. The image is computed as described above with reference to FIG. 5 with spectral enhancement executed as described above. Comparison of the two images in FIGS. 21A and 21B reveals that spectral enhancement of the seismic data sharpens and enhances resolution of features of the image shown in FIG. 21B, as revealed by examination of the features indicated by directional arrows 2102 and 2104.

Figure 22A:
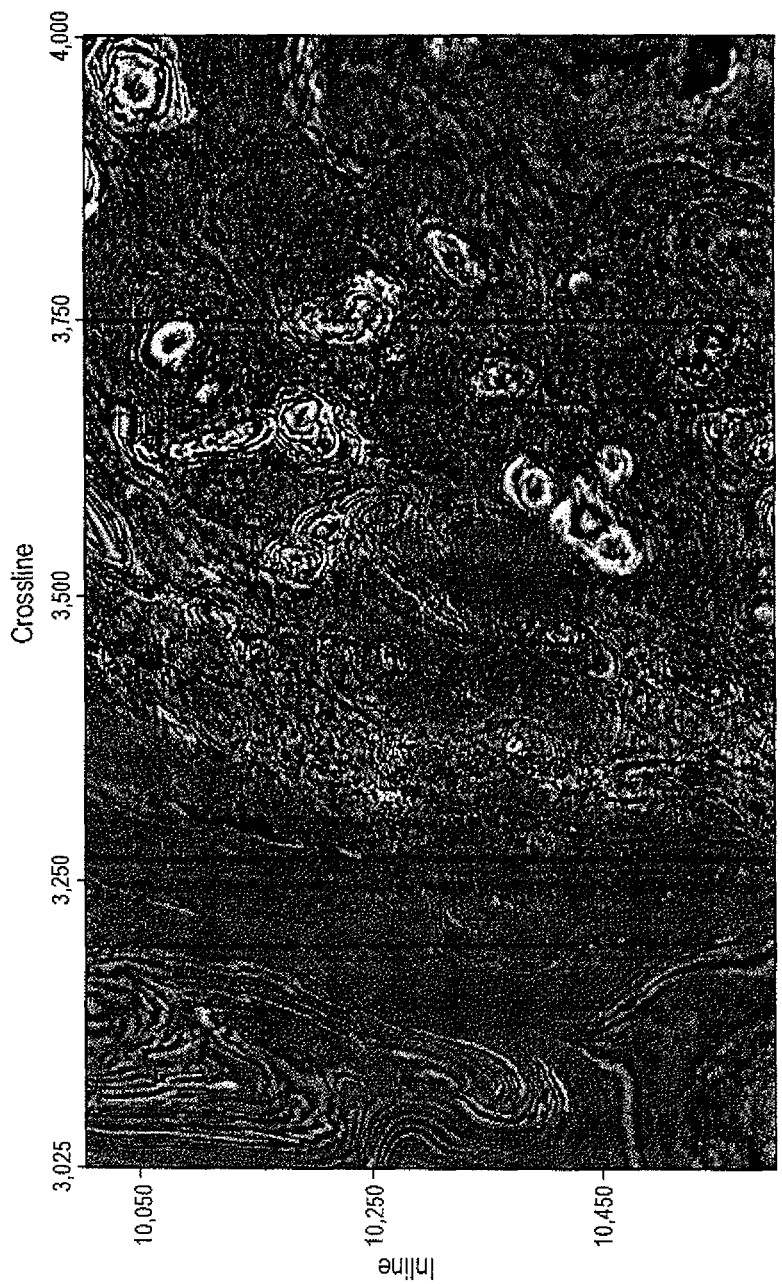
FIGS. 22A-22B show two two-dimensional images of the same region of a subterranean formation without and with spectral enhancement, respectively.
Figure 22B:
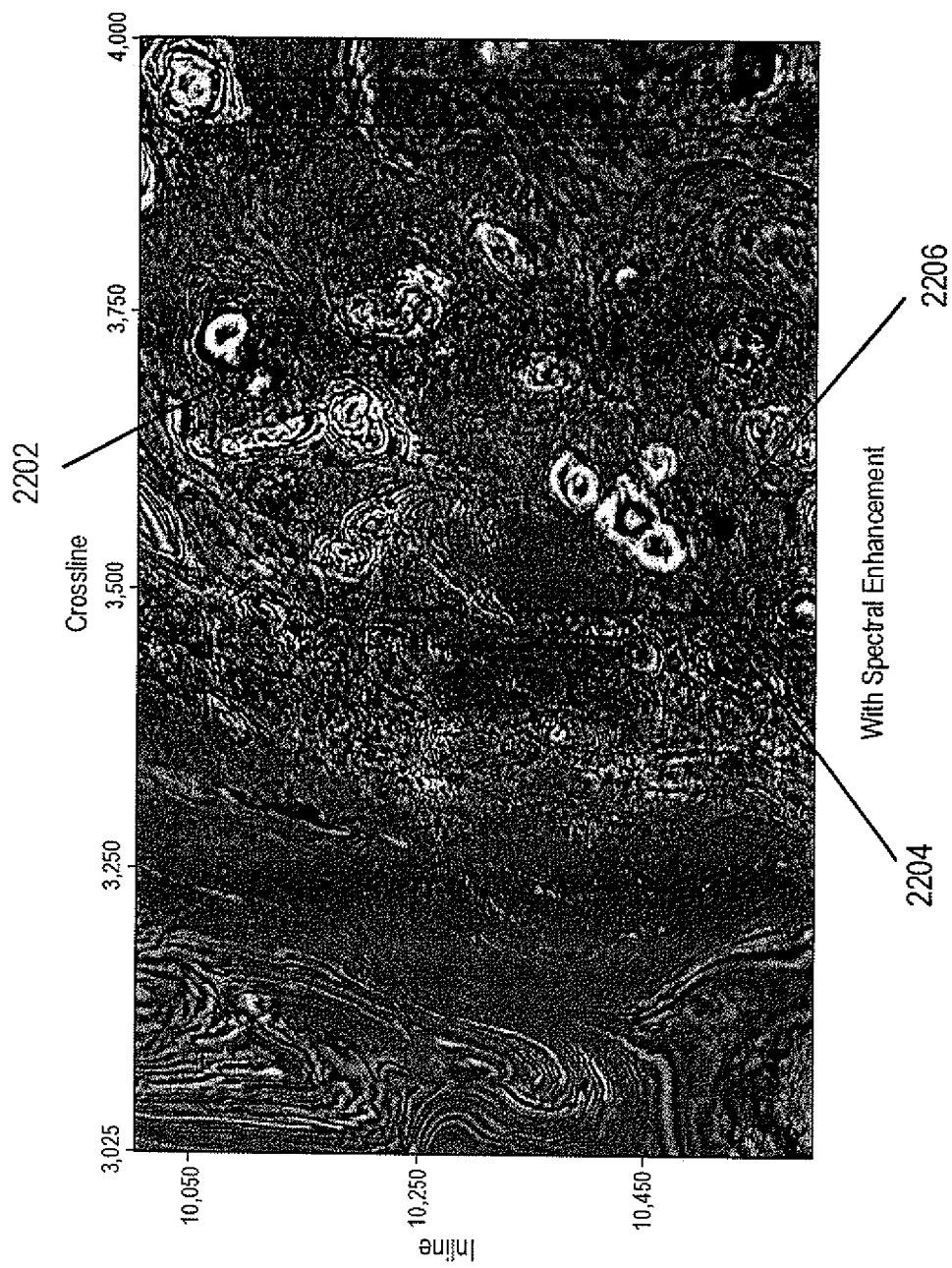

FIG. 22A shows a two-dimensional inline-crossline plane view of an image of a subterranean formation computed as described above with reference to FIG. 5 but without spectral enhancement of the seismic data. The image reveals variations in composition of the subterranean formation in an inline-crossline plane. By contrast, FIG. 22B shows a two-dimensional inline-crossline plane view of an enhanced image of the same section of the subterranean formation shown in FIG. 22A. The image is computed as described above with reference to FIG. 5 with spectral enhancement executed as described above. Comparison of the two images in FIGS. 22A and 22B reveals that spectral enhancement of the seismic data sharpens and enhances resolution of features within the image shown in FIG. 22B, as revealed by examination of the features indicated by directional arrows 2202, 2204, and 2206.

The methods and systems disclosed herein may be used to manufacture a geophysical data product indicative of certain properties of a subterranean formation. The geophysical data product may include geophysical data such as pressure data, particle motion data, particle velocity data, particle acceleration data, and any seismic image that results from using the methods and systems described above. The geophysical data product may be stored on a non-transitory computer-readable medium, such as a geophysical data product 2030 stored in the computer-readable medium 2028 shown in FIG. 20. The geophysical data product may be produced offshore (i.e., by equipment on the survey vessel 102) or onshore (i.e., at a computing facility on land).

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for generating an image of a subterranean formation located beneath a body of water using marine seismic techniques in which a source is activated in the body of water above the subterranean formation and receivers located in the body of water measure wavefield responses from the subterranean formation to acoustic signals produced by the source and record the wavefield responses as recorded seismic data in a data-storage device, the specific improvement comprising:
   computing a volume of migrated seismic data from the recorded seismic data;
   computing an average log spectrum of the migrated seismic data in each window of the volume of migrated seismic data;
   determining a useful frequency bandwidth of the average log spectrum of each window;
   computing spectral weights over the useful frequency bandwidth of the average log spectrum of each window;
   computing a spectrally enhanced trace of the migrated seismic data in each window based on the spectral weights of each window; and
   using the spectrally enhanced traces of the volume of migrated seismic data in generating the image of the subterranean formation, thereby enhancing resolution of the image of the subterranean formation.

2. The process of claim 1, wherein computing the average log spectrum of the migrated seismic data in each window of the volume comprises:
   for each trace of the migrated seismic data contained in a window of the volume,
      computing a spectrum of the migrated seismic data of the trace contained in the window, and
      computing a log spectrum of the spectrum; and
   computing an average log spectrum by averaging the log spectrum value for each frequency of the log spectra of the migrated seismic data in the window.

3. The process of claim 1, wherein determining the useful frequency bandwidth of the average log spectrum of each window comprises:
   fitting a Ricker spectrum to the average log spectrum;
   computing a maximum value of the Ricker spectrum;
   subtracting a bandwidth drop from the maximum value of the Ricker spectrum; and
   computing a minimum and maximum frequencies of the useful frequency bandwidth from the Ricker spectrum at the bandwidth drop from the maximum value of the Ricker spectrum.

4. The process of claim 1, wherein computing the spectral weights over the useful frequency bandwidth of the average log spectrum of each window comprises:
   performing spectral smoothing of the average log spectrum in each window to generate a pilot spectrum of each window; and
   computing the spectral weights of each window based on constrained optimization of the pilot spectrum the migrated seismic data in the window.

5. The process of claim 1, wherein computing a spectrally enhanced trace of the migrated seismic data in each window comprises:
   identifying a centrally located trace in an inline-crossline plane of the volume of the migrated seismic data, the centrally located trace being the target trace;
   computing a spectrum of the migrated seismic data of the target trace contained in the window;
   computing a log spectrum of the spectrum;
   adding the spectral weights to the log spectrum over the useful frequency range to obtain a spectrally enhanced log spectrum of the migrated seismic data points of the target trace in the window;
   transforming the spectrally enhanced log spectrum back to the space-time domain to obtain spectrally enhanced migrated seismic data of the target trace within the time interval of the window; and
   replacing the migrated seismic data of the target trace in the window with the spectrally enhanced migrated seismic data.

6. The process of claim 1, wherein each window of the volume of migrated seismic data overlaps migrated seismic data contained within at least one other window of the volume of PSM seismic data.

7. A computer system for computing an image of a subterranean formation from recorded seismic data collected in a marine seismic survey of a subterranean formation, the system comprising:
   one or more processors;
   one or more data-storage devices; and
   machine-readable instructions stored in the one or more data-storage devices that when executed using the one or more processors controls the system to execute
      a migration module for computing a volume of migrated seismic data from the recorded seismic data;
      an average log spectrum module for computing an average log spectrum of the migrated seismic data in each window of the volume of migrated seismic data;
      a useful frequency bandwidth module for computing a useful frequency bandwidth of the average log spectrum of each window;
      a spectral weights module for computing spectral weights over the useful frequency bandwidth of the average log spectrum of each window;
      an apply spectral weights module for computing a spectrally enhanced trace of the migrated seismic data in each window based on the spectral weights of each window; and
      an imaging module for generating an image of the subterranean formation based on the spectrally enhanced traces of the volume of migrated seismic data in, thereby spectrally enhancing the image of the subterranean formation.

8. The system of claim 7, wherein computing the average log spectrum of the migrated seismic data in each window of the volume comprises:
   for each trace of the migrated seismic data contained in a window of the volume,
      computing a spectrum of the migrated seismic data of the trace contained in the window, and
      computing a log spectrum of the spectrum; and
   computing an average log spectrum by averaging the log spectrum value for each frequency of the log spectra of the migrated seismic data in the window.

9. The system of claim 7, wherein determining the useful frequency bandwidth of the average log spectrum of each window comprises:
   fitting a Ricker spectrum to the average log spectrum;
   computing a maximum value of the Ricker spectrum;
   subtracting a bandwidth drop from the maximum value of the Ricker spectrum; and computing a minimum and maximum frequencies of the useful frequency bandwidth from the Ricker spectrum at the bandwidth drop from the maximum value of the Ricker spectrum.

10. The system of claim 7, wherein computing the spectral weights over the useful frequency bandwidth of the average log spectrum of each window comprises:
performing spectral smoothing of the average log spectrum in each window to generate a pilot spectrum of each window; and
computing the spectral weights of each window based on constrained optimization of the pilot spectrum the migrated seismic data in the window.

11. The system of claim 7, wherein computing a spectrally enhanced trace of the migrated seismic data in each window comprises:
identifying a centrally located trace in an inline-crossline plane of the volume of the migrated seismic data, the centrally located trace being the target trace;
computing a spectrum of the migrated seismic data of the target trace contained in the window;
computing a log spectrum of the spectrum;
adding the spectral weights to the log spectrum over the useful frequency range to obtain a spectrally enhanced log spectrum of the migrated seismic data points of the target trace in the window;
transforming the spectrally enhanced log spectrum back to the space-time domain to obtain spectrally enhanced migrated seismic data of the target trace within the time interval of the window; and
replacing the migrated seismic data of the target trace in the window with the spectrally enhanced migrated seismic data.

12. The system of claim 7, wherein each window of the volume of migrated seismic data overlaps migrated seismic data contained within at least one other window of the volume of PSM seismic data.

13. A non-transitory computer-readable medium encoded with machine-readable instructions that implement a method carried out by one or more processors of a computer system to perform the operations of
computing a volume of migrated seismic data from recorded seismic data obtained in a marine survey of a subterranean formation;
for each overlapping window of the volume of migrated seismic data,
computing an average log spectrum of the migrated seismic data in the window,
computing a useful frequency bandwidth of the average log spectrum,
computing spectral weights over the useful frequency bandwidth of the average log spectrum, and
computing a spectrally enhanced trace of the migrated seismic data based on the spectral weights; and
generating an image of the subterranean formation based on the spectrally enhanced traces of the volume of migrated seismic data in.

14. The medium of claim 13, wherein computing the average log spectrum of the migrated seismic data in the window comprises:
for each trace of the migrated seismic data contained in the window,
computing a spectrum of the migrated seismic data of the trace, and
computing a log spectrum of the spectrum; and
computing an average log spectrum by averaging the log spectrum value for each frequency of the log spectra of the migrated seismic data in the window.

15. The medium of claim 13, wherein determining the useful frequency bandwidth of the average log spectrum comprises:
fitting a Ricker spectrum to the average log spectrum;
computing a maximum value of the Ricker spectrum;
subtracting a bandwidth drop from the maximum value of the Ricker spectrum; and
computing a minimum and maximum frequencies of the useful frequency bandwidth from the Ricker spectrum at the bandwidth drop from the maximum value of the Ricker spectrum.

16. The medium of claim 13, wherein computing the spectral weights over the useful frequency bandwidth of the average log spectrum comprises:
performing spectral smoothing of the average log spectrum in each window to generate a pilot spectrum; and
computing the spectral weights of each window based on constrained optimization of the pilot spectrum.

17. The medium of claim 13, wherein computing a spectrally enhanced trace of the migrated seismic data comprises:
identifying a centrally located trace in an inline-crossline plane of the volume of the migrated seismic data, the centrally located trace being the target trace;
computing a spectrum of the migrated seismic data of the target trace contained in the window;
computing a log spectrum of the spectrum;
adding the spectral weights to the log spectrum over the useful frequency range to obtain a spectrally enhanced log spectrum of the migrated seismic data points of the target trace in the window;
transforming the spectrally enhanced log spectrum back to the space-time domain to obtain spectrally enhanced migrated seismic data of the target trace within the time interval of the window; and
replacing the migrated seismic data of the target trace in the window with the spectrally enhanced migrated seismic data.

18. The medium of claim 13, wherein each window of the volume of migrated seismic data overlaps migrated seismic data contained within at least one other window of the volume of migrated seismic data.

19. A method of manufacturing a geophysical data product, the method comprising:
computing a volume of migrated seismic data from recored seismic data obtained in a marine seismic survey of a subterranean formation;
computing an average log spectrum of the migrated seismic data in each window of the volume of migrated seismic data;
determining a useful frequency bandwidth of the average log spectrum of each window;
computing spectral weights over the useful frequency bandwidth of the average log spectrum of each window;
computing a spectrally enhanced trace of the migrated seismic data in each window based on the spectral weights of each window;
using the spectrally enhanced traces of the volume of migrated seismic data in generating an image of the subterranean formation, thereby spectrally enhancing the image of the subterranean formation; and
recording the image of the subterranean formation in a non-transitory computer-readable medium.

* * * * *